United States Patent
Yoshimura et al.

(10) Patent No.: US 10,254,696 B2
(45) Date of Patent: Apr. 9, 2019

(54) IMAGE FORMING APPARATUS AND SYSTEM FOR PRINTING SETS OF DOCUMENTS

(71) Applicant: FUJI XEROX CO., LTD., Tokyo (JP)

(72) Inventors: Koichi Yoshimura, Kanagawa (JP); Shigeru Yoneda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/606,427

(22) Filed: May 26, 2017

(65) Prior Publication Data

US 2018/0017925 A1  Jan. 18, 2018

(30) Foreign Application Priority Data

Jul. 13, 2016 (JP) .................. 2016-138865

(51) Int. Cl.
*G03G 15/00* (2006.01)
*G03G 15/01* (2006.01)
*H04N 1/00* (2006.01)

(52) U.S. Cl.
CPC ..... *G03G 15/6511* (2013.01); *G03G 15/0105* (2013.01); *G03G 15/0121* (2013.01); *G03G 15/6508* (2013.01); *H04N 1/00352* (2013.01); *H04N 1/00912* (2013.01)

(58) Field of Classification Search
None
See application file for complete search history.

(56) References Cited

U.S. PATENT DOCUMENTS

| 3,592,462 | A | * | 7/1971 | Fackler | B65H 3/54 271/123 |
| 5,987,223 | A | * | 11/1999 | Narukawa | G06K 15/00 358/1.9 |
| 2004/0190057 | A1 | * | 9/2004 | Takahashi | G06F 3/1205 358/1.15 |
| 2014/0042688 | A1 | * | 2/2014 | Suzuki | B65H 5/00 271/9.01 |
| 2014/0153029 | A1 | * | 6/2014 | Kasahara | G06K 15/4065 358/1.14 |
| 2015/0145198 | A1 | * | 5/2015 | Sakata | B65H 3/44 271/9.02 |

FOREIGN PATENT DOCUMENTS

JP   H06-064248 A   3/1994

* cited by examiner

*Primary Examiner* — Thomas D Lee
(74) *Attorney, Agent, or Firm* — Oliff PLC

(57) ABSTRACT

An image forming apparatus includes a first medium supply unit, a second medium supply unit, and an image forming unit. The image forming unit forms, upon receiving an instruction to print document data for a plural number of sets, an image of the document data on a medium supplied from the first medium supply unit up to a preset number of the plural number of sets and forms an image of the document data on a medium supplied from the second medium supply unit for a remaining number of the plural number of sets.

15 Claims, 19 Drawing Sheets

IMAGE FORMING APPARATUS AND SYSTEM FOR PRINTING SETS OF DOCUMENTS

CROSS-REFERENCE TO RELATED APPLICATIONS

This application is based on and claims priority under 35 USC 119 from Japanese Patent Application No. 2016-138865 filed Jul. 13, 2016.

BACKGROUND

Technical Field

The present invention relates to an image forming apparatus and system.

SUMMARY

According to an aspect of the invention, there is provided an image forming apparatus including a first medium supply unit, a second medium supply unit, and an image forming unit. The image forming unit forms, upon receiving an instruction to print document data for a plural number of sets, an image of the document data on a medium supplied from the first medium supply unit up to a preset number of the plural number of sets and forms an image of the document data on a medium supplied from the second medium supply unit for a remaining number of the plural number of sets.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below in detail with reference to the accompanying drawings.

[First Exemplary Embodiment]

Figure 1:
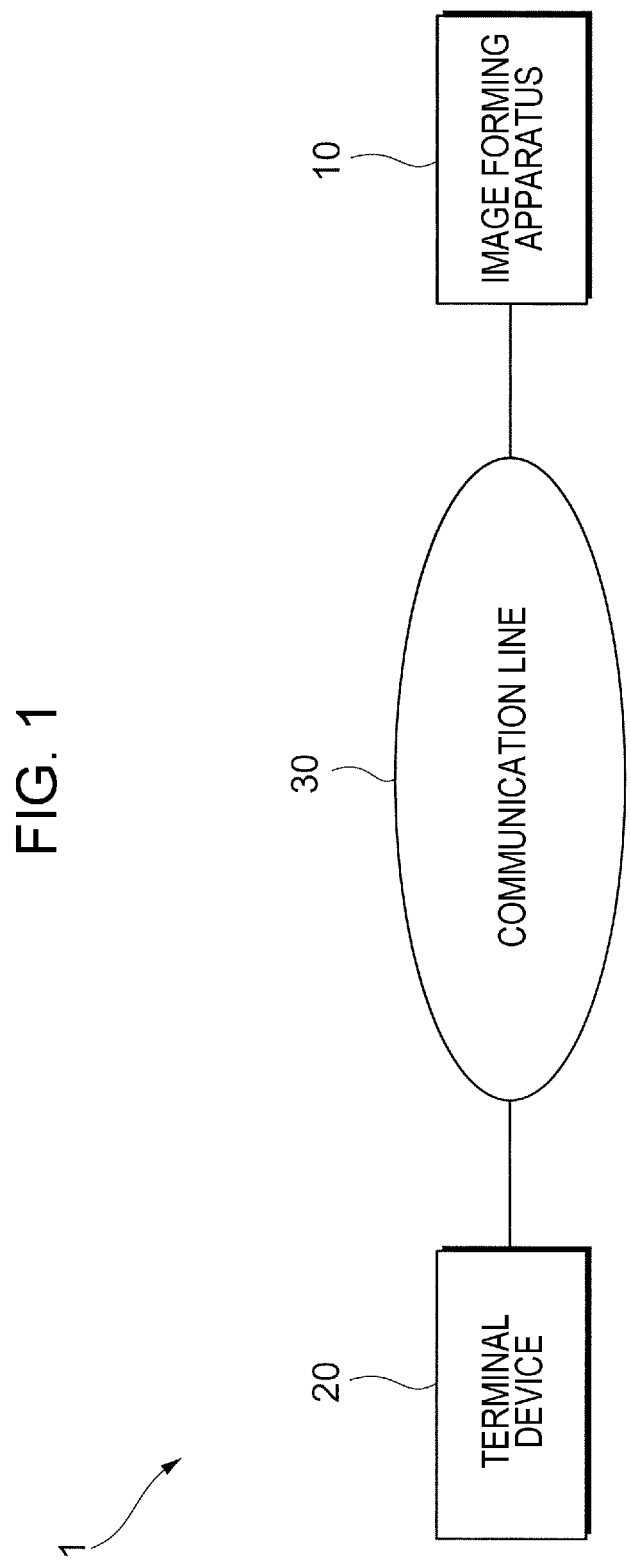
FIG. 1 illustrates an example of the schematic configuration of an image forming system according to a first exemplary embodiment.

FIG. 1 illustrates an example of the schematic configuration of an image forming system 1 according to a first exemplary embodiment of the invention.

The image forming system 1 includes an image forming apparatus 10. The image forming apparatus 10 has the following functions: copying a document; generating image data indicating a read document; and forming an image indicated by generated image data on a recording medium, such as a sheet.

The image forming system 1 also includes a terminal device 20. The terminal device 20 receives information input by a user and outputs information to a user.

The image forming apparatus 10 and the terminal device 20 are connected to a communication line 30 so that they can communicate with each other via the communication line 30.

In this specification, a recording medium is not restricted to a particular material and may be any material on which an image can be formed. Though a typical example of a recording medium is paper, a recording medium may be an overhead projector (OHP) sheet or a metal sheet.

Figure 2:
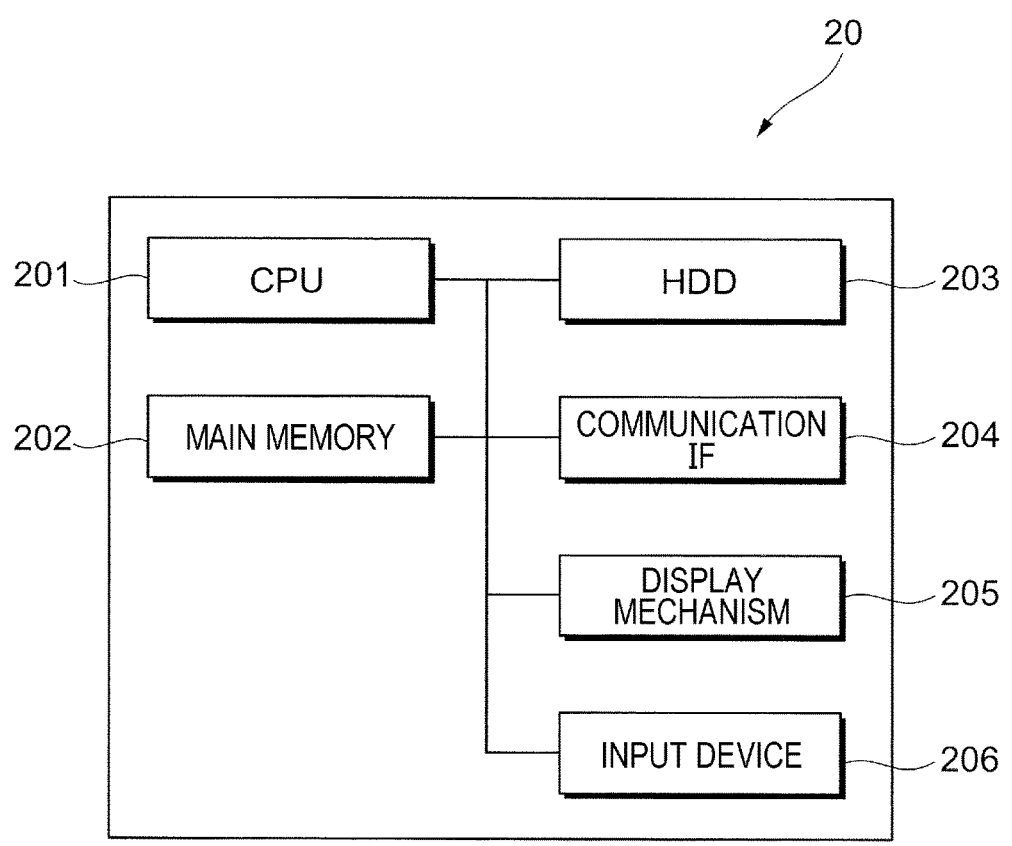
FIG. 2 is a block diagram illustrating an example of the hardware configuration of a terminal device according to the first exemplary embodiment.

FIG. 2 is a block diagram illustrating an example of the hardware configuration of the terminal device 20.

As shown in FIG. 2, the terminal device 20 includes a central processing unit (CPU) 201, a main memory 202, a hard disk drive (HDD) 203, a communication interface (IF) 204 for performing communication with an external device, a display mechanism 205, such as a video memory and a display, and an input device 206, such as a keyboard and a mouse.

A program executed by the CPU 201 may be provided as a result of being stored in a computer readable recording medium, such as a magnetic recording medium (magnetic tape and a magnetic disk, for example), an optical recording medium (an optical disc, for example), a magneto-optical recording medium, and a semiconductor memory. The program may be downloaded to the terminal device 20 via a communication medium, such as the Internet.

Figure 3:
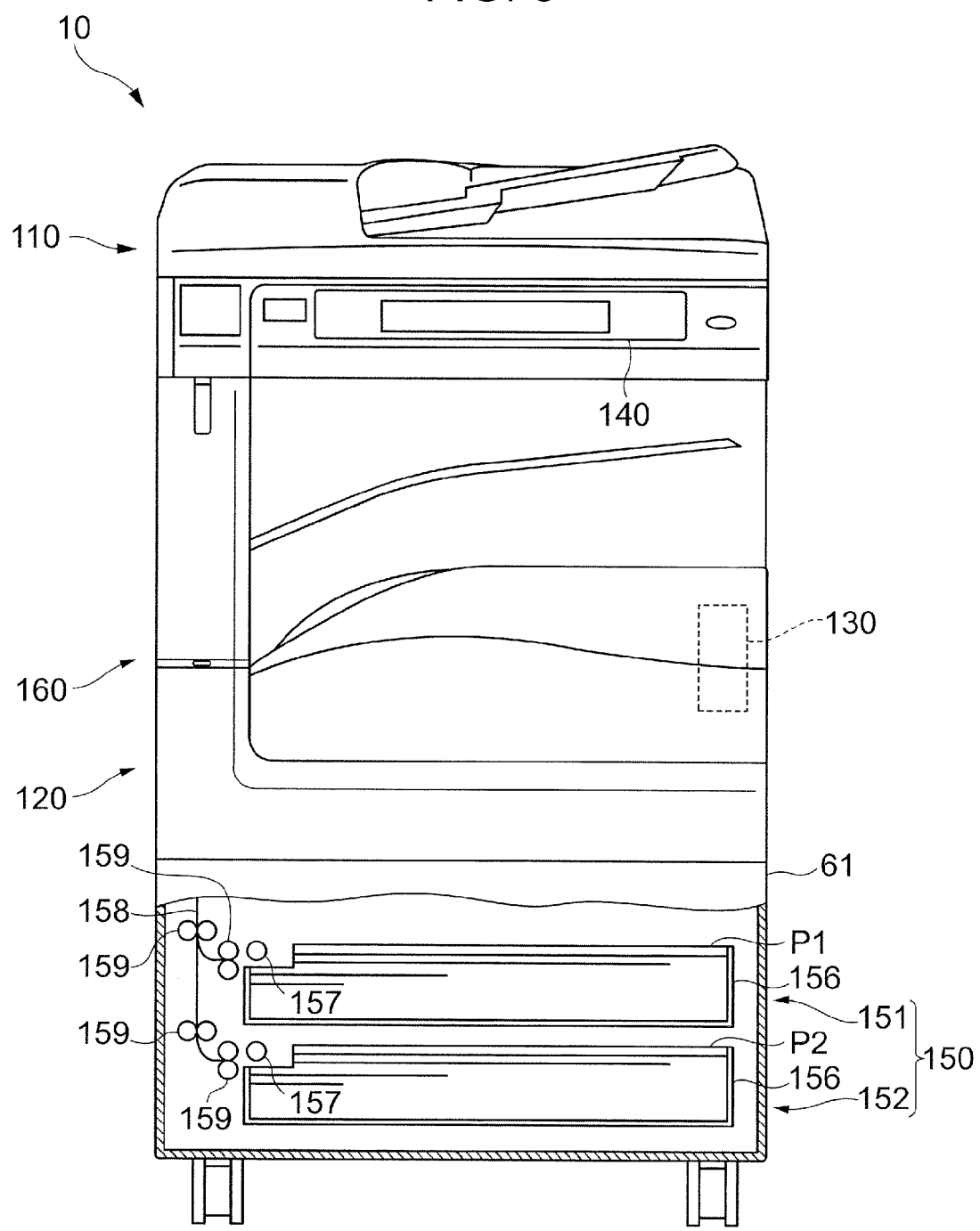
FIG. 3 illustrates an example of the schematic configuration of an image forming apparatus according to the first exemplary embodiment.

FIG. 3 illustrates an example of the schematic configuration of the image forming apparatus 10 according to the first exemplary embodiment.

The image forming apparatus 10 includes an image reader 110, an image forming device 120, a controller 130, a user interface (UI) 140, a supply device 150, and a discharge device 160. The image reader 110 reads an image of a document. The image forming device 120 is an example of an image forming unit that forms an image on a recording medium. The controller 130 includes a microcomputer constituted by a CPU, a read only memory (ROM), a random access memory (RAM), etc., and controls the operation of the entire image forming apparatus 10. The user interface 140, which is constituted by a touch panel, for example, outputs an instruction from a user to the controller 130 and also presents information from the controller 130 to a user. The supply device 150, which is disposed below the image forming device 120, stores a recording medium therein and supplies a recording medium to the image forming device 120. The discharge device 160 is disposed above the image forming device 120 and discharges a recording medium on which an image is formed by the image forming device 120.

The image reader 110 includes platen glass (not shown), a light irradiating unit (not shown), a light guiding unit (not shown), and an imaging lens (not shown). The light irradiating unit irradiates the reading surface (image surface) of a document with light. The light guiding unit guides light applied to the reading surface of a document and reflected by the reading surface. The imaging lens forms an optical image of the light guided by the light guiding unit. The image reader 110 also includes a detector (not shown) and an image processor. The detector is constituted by a photoelectric converter element, such as a charge coupled device (CCD) image sensor, and detects the optical image formed by the imaging lens. The photoelectric converter element converts the optical image into an electric signal. The image processor is electrically connected to the detector to receive the electric signal obtained by the detector.

The image reader 110 reads an image of a document fed by a document feeder and an image of a document placed on the platen glass.

The image forming device 120 includes four image forming units of yellow, magenta, cyan, and black which are arranged in parallel with each other at regular intervals. Each image forming unit includes a photoconductor drum (not shown), a discharger (not shown), a developing unit (not shown), and a toner cartridge (not shown). The discharger uniformly charges the surface of the photoconductor drum. The developing unit develops a latent image formed on the photoconductor drum by using toner to visualize the latent image. The toner cartridge supplies toner of a corresponding color to the developing unit.

The image forming device 120 also includes an optical unit (not shown), an intermediate transfer unit (not shown), a second transfer unit (not shown), and a fixing unit (not shown). The optical unit irradiates each photoconductor drum with laser light. The intermediate transfer unit transfers toner images of the individual colors formed on the photoconductor drums onto an intermediate transfer belt (not shown). The second transfer unit transfers a superposed toner image formed on the intermediate transfer unit to a recording medium. The fixing unit heats and pressurizes the toner image on the recording medium so as to fix the toner image.

The supply device 150 includes first and second medium supply units 151 and 152. The first medium supply unit 151 serves as an example of a supply unit and a first medium supply unit which store a first recording medium P1 therein and which supply the first recording medium P1 to the image forming device 120. The second medium supply unit 152 serves as an example of a second medium supply unit which stores a second recording medium P2 therein and which supplies the second recording medium P2 to the image forming device 120.

The first and second medium supply units 151 and 152 each include a medium storage portion 156, a feeder roller 157, a transport path 158, and transport rollers 159. The medium storage portion 156 stores a recording medium therein. The feeder roller 157 feeds a recording medium stored in the medium storage portion 156. The transport path 158 transports a recording medium fed by the feeder roller 157. The transport rollers 159 are disposed along the transport path 158 and transport a recording medium fed by the feeder roller 157 to a second transfer position.

The first medium supply unit 151 according to the first exemplary embodiment stores a first recording medium P1 which is dedicated to original documents. That is, a printed material generated by forming an image of document data by the image forming device 120 on the first recording medium P1 supplied from the first medium supply unit 151 is an original document.

The second medium supply unit 152 according to the first exemplary embodiment stores a second recording medium P2 which is dedicated to copies. That is, a printed material generated by forming an image of document data by the image forming device 120 on the second recording medium P2 supplied from the second medium supply unit 152 is a copy.

The medium storage portion 156 of the first medium supply unit 151 is locked and is allowed to be opened only by authorized users.

Figure 4:
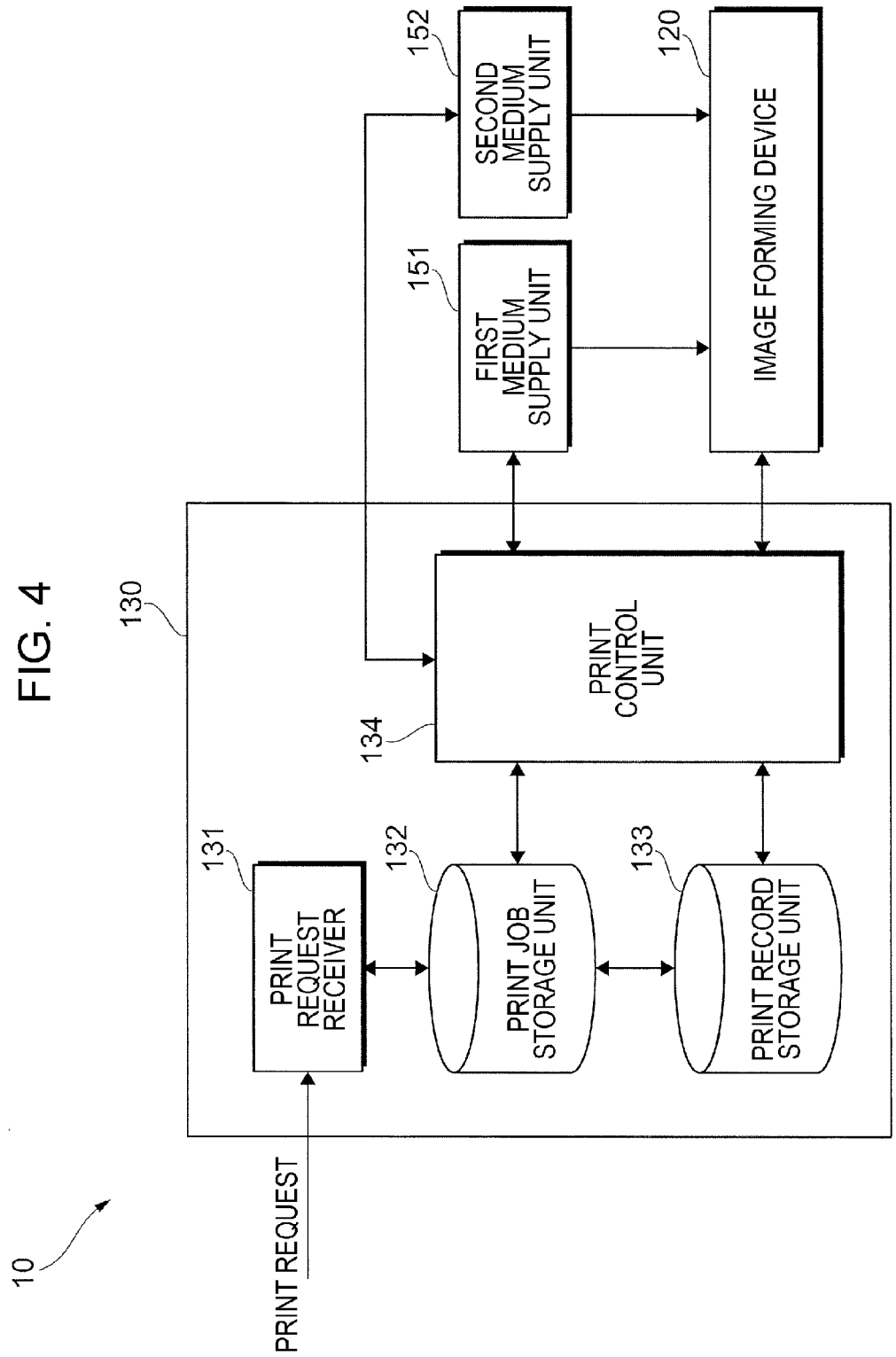
FIG. 4 is a block diagram illustrating an example of the functional configuration of a controller of the image forming apparatus according to the first exemplary embodiment.

FIG. 4 is a block diagram illustrating an example of the functional configuration of the controller 130 of the image forming apparatus 10 according to the first exemplary embodiment.

The controller 130 includes a print request receiver 131, a print job storage unit 132, a print record storage unit 133, and a print control unit 134. The print request receiver 131 receives a print request (request to form an image on a recording medium) including a print job from the terminal device 20. The print job storage unit 132 stores a print job. The print record storage unit 133 is an example of a storage unit which stores a print record. The print control unit 134 controls printing of document data by executing a print job received by the print request receiver 131.

A print job is a unit of processing executed by the image forming apparatus 10 based on print instruction information indicating an instruction to print document data.

In this specification, however, print instruction information may also be called a print job.

In this specification, digital data indicating an image to be recorded on a recording medium is called "document data". Document data includes, not only data formed by digitizing a text document, but also image data (raster data and vector data), such as pictures, photos, and drawings, data recorded by using database management software and spreadsheet software, and other digital data that can be printed.

The print record storage unit 133 stores a document ID, which is identification number for identifying document data, a flag (original flag) indicating whether document data represented by this document ID is required to be printed as an original, and information indicating whether this document data has already been printed as an original, and if it has been printed, information indicating the accumulated number of sets of this document printed as the original. In the print record storage unit 133, the document ID, the flag, and the above-described items of information are stored in association with each other.

A program executed by the CPU of the controller 130 may be provided as a result of being stored in a computer readable recording medium, such as a magnetic recording medium (magnetic tape and a magnetic disk, for example), an optical recording medium (an optical disc, for example), a magneto-optical recording medium, and a semiconductor memory. The program may be downloaded to the image forming apparatus 10 via a communication medium, such as the Internet.

Figure 5:
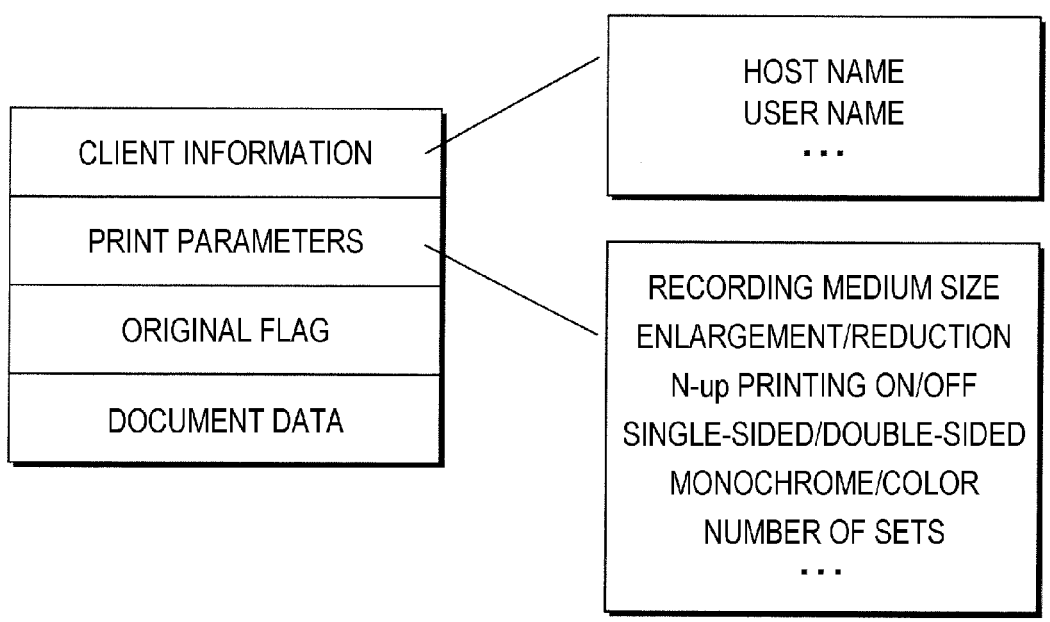
FIG. 5 illustrates information included in a print job.

FIG. 5 illustrates information included in a print job.

As shown in FIG. 5, a print job includes client information concerning a client requested the print job, print parameters, an original flag, and document data.

The client information includes information concerning a host name and a user name.

The print parameters include a recording medium size, whether to enlarge or reduce a document, whether to print multiple pages on one sheet (whether to perform N-up printing), whether to perform single-sided printing or double-sided printing, whether to perform monochrome printing or color printing, and the number of print sets.

The original flag indicates information whether this print job is a request to print the document data on the first recording medium P1 dedicated to original documents. For example, if this print job is a request to print the document data on the first recording medium P1, the original flag is included in the print job.

The image forming system 1 configured as described above according to the first exemplary embodiment may be utilized by a receiver (document receiver). More specifically, upon receiving a document sent from a sender (document sender), a receiver operates the terminal device 20 to print the document by using the image forming apparatus 10. The image forming system 1 is suitably used for printing out a letter or private correspondence as an example of a document. A letter or private correspondence is a document containing information or a fact provided from a sender addressed to a specific receiver. Examples of a letter or private correspondence are invoices, notice of gatherings, permits, certificates, and direct mail. Examples of invoices are statements of delivery, receipts, estimates, applications, and contracts. Examples of notice of gatherings are invitations, such as wedding invitations, and business reports. Examples of permits are licenses, recognition certificates, and achievement certificates. Examples of certificates are certificates of seal impression, certificates of tax payments, copies of certificates of family register, and copies of certificates of residence. The original of a certificate of residence and that of a certificate of family register are managed in a municipal office, and the municipal office issues a copy of a certificate of residence or a copy of a certificate of family register to a user. An example of direct mail is a document on which the name of a receiver is indicated.

When a request to print a document which requires the original assurance or authenticity is made, it is necessary to print such a document on a recording medium dedicated to original documents (first recording medium P1 in the first exemplary embodiment). Examples of documents which require the original assurance or authenticity are a copy of a certificate of residence, a copy of a certificate of family register, and a valuable ticket. If a document which requires the original assurance or authenticity is a valuable ticket, the uniqueness as well as the original assurance or authenticity is required. If such a document is a copy of a certificate of residence or a copy of a certificate of family register for which the charging cost varies according to the number of print sets, it is necessary to print out only a permitted number of sets for such a document, as well as to guarantee the original assurance or authenticity. Printing out such a document for more than a permitted number of sets is not allowed.

If a user needs a copy of a document which requires the original assurance or authenticity, the user is required to copy the obtained document by using a copying machine.

It is thus desirable that the image forming apparatus 10 have, not only a function of printing a document which requires the original assurance or authenticity, but also a function of copying such a document. This enables the user to obtain a document which requires the original assurance or authenticity and a copy of this document at the same time.

To satisfy this demand, the image forming apparatus 10 according to the first exemplary embodiment performs the following processing in response to a print job including the above-described original flag. If document data included in the print job is printed for the first time, an image of this document data is formed on the first recording medium P1 supplied from the first medium supply unit 151 up to a preset number Np of sets for this image data. The preset number Np is determined in advance. If a requested number Nd of sets of this document data exceeds the preset number Np, an image of the document data for an exceeded number Ns (=Nd−Np) of sets is formed on the second recording medium P2 supplied from the second medium supply unit 152. The exceeded number Ns can be calculated by subtracting the preset number Np from the requested number Nd.

On the other hand, in response to a print job including the original flag, if document data included in this print job is printed for the second or subsequent time, the image forming apparatus 10 forms an image of this document data, not on the first recording medium P1 supplied from the first medium supply unit 151, but on the second recording medium P2 supplied from the second medium supply unit 152, for all the requested number Nd of sets.

In response to a print job without the original flag, the image forming apparatus 10 forms an image of this document data on the second recording medium P2 supplied from the second medium supply unit 152 for all the requested number Nd of sets.

If a document which requires the original assurance or authenticity is a valuable ticket, the preset number Np is usually one. If the preset number Np is one, in response to a print job including the original flag, the image forming apparatus 10 supplies one sheet of first recording medium P1 from the first medium supply unit 151 and forms an image of the document data on the first recording medium P1 if the document data is printed for the first time. If the requested number Nd is two or more, the image forming apparatus 10 forms an image of the document data on the second recording medium P2 supplied from the second medium supply unit 152 for the second or subsequent set, that is, for the exceeded number Ns (=Nd−1) of sets.

The preset number Np may be stored in the image forming apparatus 10 in advance. Information that the preset number Np is one when a document which requires the original assurance or authenticity is a valuable ticket may be stored in the ROM in advance. Upon detecting that document data included in a print job is a valuable ticket, the image forming apparatus 10 reads the preset number Np=1 from the ROM and performs the above-described processing.

The preset number Np may be included in a print job. That is, the preset number Np may be included, together with the original flag, in a print job. For example, a user using the terminal device 20 may input the preset number Np when making a print request. Alternatively, the terminal device 20 may store information that the preset number Np is one when a document which requires the original assurance or authenticity is a valuable ticket is stored in the ROM in advance. Upon detecting that document data to be printed is a valuable ticket, the terminal device 20 reads the preset number Np=1 from the ROM and inputs Np=1 into the print job.

Figure 6:
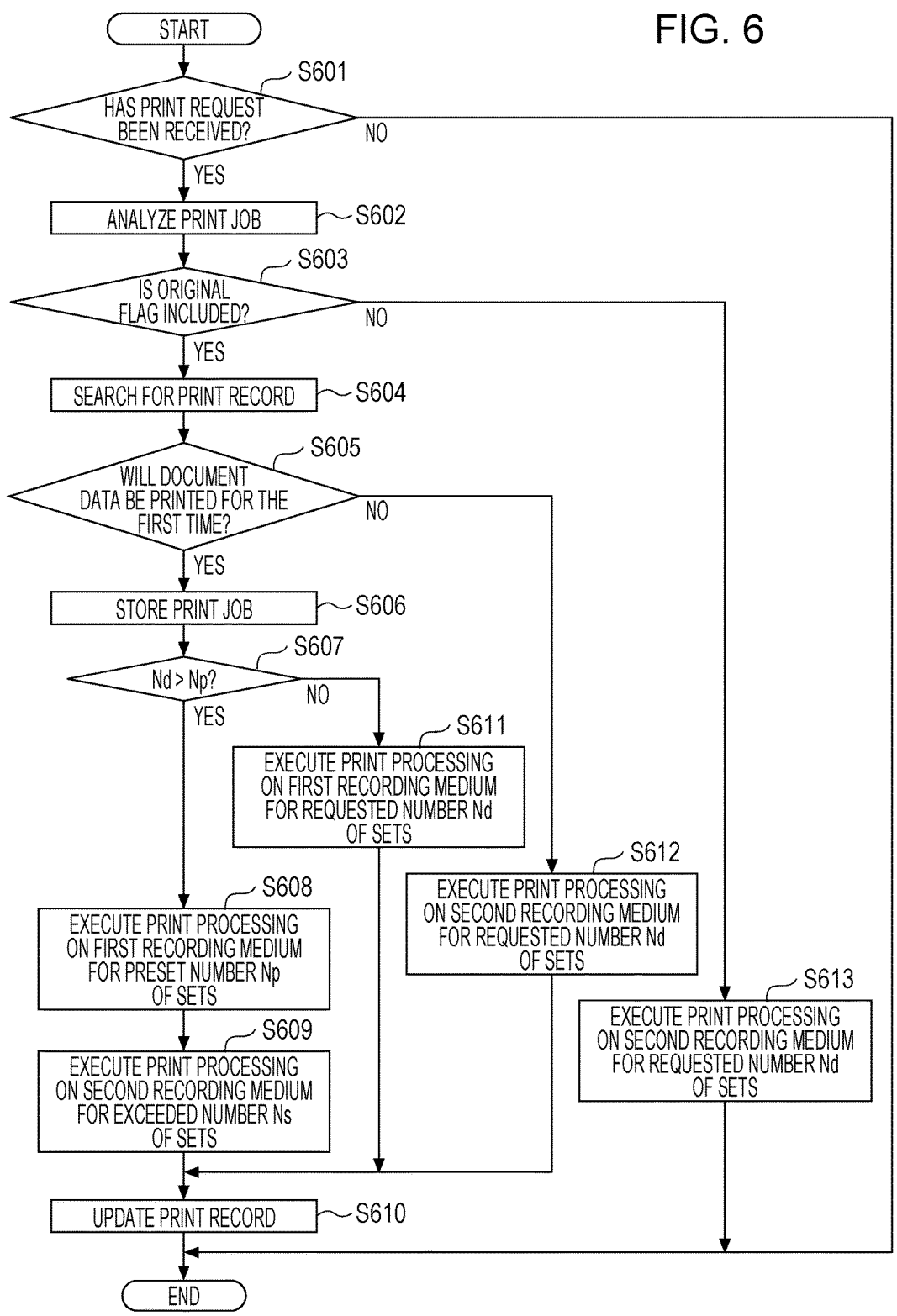
FIG. 6 is a flowchart illustrating image forming processing executed by the controller of the image forming apparatus according to the first exemplary embodiment.

FIG. 6 is a flowchart illustrating image forming processing executed by the controller 130 of the image forming apparatus 10.

The controller 130 repeatedly executes this image forming processing at regular preset intervals (one millisecond, for example).

In step S601, the controller 130 determines whether the print request receiver 131 has received a print request. A print request received by the print request receiver 131 is stored in the print job storage unit 132. If a print request is received (YES in step S601), the print control unit 134 analyzes a print job included in the received print request in step S602. The print control unit 134 then determines in step S603 whether the original flag is included in the received print job.

If the original flag is included (YES in step S603), the print control unit 134 searches for a print record for document data included in the print job in step S604. The print record is stored in the print record storage unit 133. As a result of a search in step S604, the print control unit 134 determines in step S605 whether this document data will be printed for the first time. If the document data is printed for the first time (YES in step S605), the print control unit 134 stores the print job in step S606, and determines in step S607 whether the requested number Nd exceeds the preset number Np.

If the requested number Nd exceeds the preset number Np (YES in step S607), the process proceeds to step S608. In step S608, the print control unit 134 causes the first medium supply unit 151 to supply the first recording medium P1 for the preset number Np of sets, and causes the image forming device 120 to form a image of the document data on the first recording medium P1. That is, the image forming apparatus 10 executes print processing on the first recording medium P1 for the preset number Np of sets.

Then, in step S609, the print control unit 134 causes the second medium supply unit 152 to supply the second recording medium P2 for the exceeded number Ns (=Nd−Np) of sets, and causes the image forming device 120 to form an image of the document data on the second recording medium P2. That is, the image forming apparatus 10 executes print processing on the second recording medium P2 for the exceeded number Ns of sets.

Thereafter, in step S610, the print control unit 134 updates the print record. That is, the print control unit 134 causes the print record storage unit 133 to store information that an image has been formed on the first recording medium P1 for the preset number Np of sets and an image has been formed on the second recording medium P2 for the exceeded number Ns of sets.

If it is determined in step S607 that the requested number Nd does not exceed the preset number Np (NO in step S607), the process proceeds to step S611. In step S611, the print control unit 134 causes the first medium supply unit 151 to supply the first recording medium P1 for the requested number Nd of sets, and causes the image forming device 120 to form an image of the document data on the first recording medium P1. That is, the image forming apparatus 10 executes print processing on the first recording medium P1 for the requested number Nd of sets.

Thereafter, in step S610, the print control unit 134 updates the print record. That is, the print control unit 134 causes the print record storage unit 133 to store information that an image has been formed on the first recording medium P1 for the requested number Nd of sets.

If it is determined in step S605 that the document data will not be printed for the first time (NO in step S605), the process proceeds to step S612. In step S612, the print control unit 134 causes the second medium supply unit 152 to supply the second recording medium P2 for the requested number Nd of sets, and causes the image forming device 120 to form an image of the document data on the second recording medium P2. That is, the image forming apparatus 10 executes print processing on the second recording medium P2 for the requested number Nd of sets.

Thereafter, in step S610, the print control unit 134 updates the print record. That is, the print control unit 134 causes the print record storage unit 133 to store information that an image has been formed on the second recording medium P2 for the requested number Nd of sets.

If it is determined in step 5603 that the original flag is not included in the received print job (NO in step S603), the process proceeds to step S613. In step S613, the print control unit 134 causes the second medium supply unit 152 to supply the second recording medium P2 for the requested number Nd of sets, and causes the image forming device 120 to form an image of the document data on the second recording medium P2. That is, the image forming apparatus 10 executes print processing on the second recording medium P2 for the requested number Nd of sets. When the image control unit 134 executes print processing in accordance with a print job without the original flag, it finishes the image forming processing without updating the print record.

If it is determined in step S601 that a print request has not been received (NO in step S601), the controller 130 terminates the image forming processing.

In the image forming apparatus 10 configured as described above, in response to a print request to print document data which requires the original assurance or authenticity for a plural number of sets which exceeds the preset number Np, print processing (original printing) on the first recording medium P1 is restricted only to the preset number Np of sets. It is thus possible to maintain the original assurance or authenticity. In response to a print request to print the same document data again (the second or subsequent time), upon detecting based on the print record that original printing has already been executed, print processing is executed on the second recording medium P2 for all the requested number Nd of sets. It is thus possible to maintain the original assurance or authenticity.

In response to a print request to print document data for the first time for a plural number of sets (requested number Nd of sets) which exceeds the preset number Np, the image forming apparatus 10 executes print processing on the first recording medium P1 for the preset number Np of sets and on the second recording medium P2 for the exceeded number Ns (=Nd−Np) of sets. This enables the user to obtain, by simply making one print instruction, not only a document which requires the original assurance or authenticity for the preset number Np of sets, but also a copy of this document for the exceeded number Ns of sets at the same time.

In the image forming system 1 according to the first exemplary embodiment, it is possible to set the preset number Np to be a desired value. This enables the user using the image forming system 1 to set the preset number Np in accordance with the document which requires the original assurance or authenticity. If the document which requires the original assurance or authenticity is a valuable ticket, the user can set the preset number Np to be one (Np=1). Then, the unique valuable ticket can be printed. If the document which requires the original assurance or authenticity is a copy of a certificate of residence or a copy of a certificate of family register, the preset number Np is set to be the number of sets in accordance with the charge paid by a requester.

In the image forming apparatus 10 of the image forming system 1 according to the first exemplary embodiment, in response to a print request to print the same document data again (the second or subsequent time), upon detecting based on the print record that original printing has already been executed in step S605, print processing is executed on the second recording medium P2 for all the requested number Nd of sets in step S612. However, step S612 may be executed in a different manner. In response to a print request to print the same document data again (the second or subsequent time), if the accumulated number of sets for which this document data has been printed on the first recording medium P1 so far does not exceed the preset number Np, the image forming apparatus 10 may execute the following processing. The image forming apparatus 10 may execute print processing on the first recording medium P1 until the accumulated number of sets reaches the preset number Np, and execute print processing on the second recording medium P2 for the remaining number of sets after the accumulated number of sets has reached the preset number Np.

[Second Exemplary Embodiment]

Figure 7:
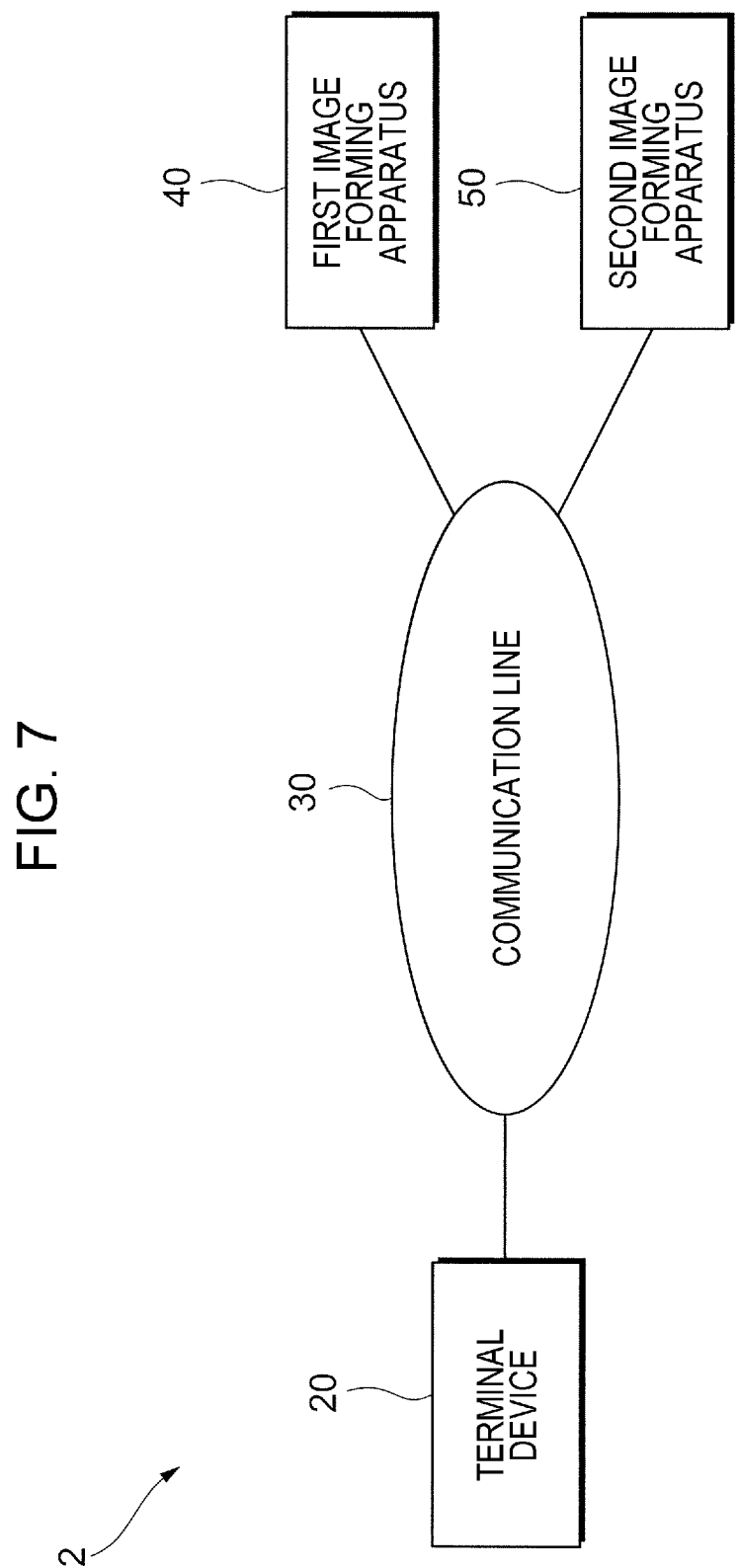
FIG. 7 illustrates an example of the schematic configuration of an image forming system according to a second exemplary embodiment.

FIG. 7 illustrates an example of the schematic configuration of an image forming system 2 according to a second exemplary embodiment of the invention.

The image forming system 2 includes first and second image forming apparatuses 40 and 50. The first and second image forming apparatuses 40 and 50 have the following functions: copying a document; generating image data indicating a read document; and forming an image indicated by generated image data on a recording medium, such as a sheet.

The image forming system 2 also includes the terminal device 20 of the first exemplary embodiment. The terminal device 20 receives information input by a user and outputs information to a user.

The first and second image forming apparatuses 40 and 50 and the terminal device 20 are connected to a communication line 30 so that they can communicate with each other via the communication line 30.

The first image forming apparatus 40 forms an image of document data on a first recording medium P1, while the second image forming apparatus 50 forms an image of document data on a second recording medium P2. If, as an example in which a predetermined condition is satisfied, an original flag is included in a request (print request) to form an image of document data for a plural number of sets, the first image forming apparatus 40 forms an image of the document data for the preset number Np of sets, and the second image forming apparatus 50 forms an image of the document data for the remaining number of sets.

As well as the image forming apparatus 10 of the first exemplary embodiment, the first and second image forming apparatuses 40 and 50 of the second exemplary embodiment each include an image reader 110, an image forming device 120, a controller 130, a user interface (UI) 140, and a discharge device 160.

The first image forming apparatus 40 includes a first medium supply unit (not shown) which stores the above-described first recording medium P1 dedicated to original documents and which supplies the first recording medium P1 to the image forming device 120. The second image forming apparatus 50 includes a second medium supply unit (not shown) which stores the above-described second recording medium P2 dedicated to copies and which supplies the second recording medium P2 to the image forming device 120.

A print record storage unit 133 of the controller 130 of the first image forming apparatus 40 stores a document ID, a flag (original flag) indicating whether document data represented by this document ID is required to be printed as an original, and information indicating whether an original of the document data has already been printed, and if it has been printed, information indicating the accumulated number of print sets of this document printed as the original. In the print record storage unit 133, the document ID, the flag, and the above-described items of information are stored in association with each other.

A medium storage portion of the first medium supply unit of the first image forming apparatus 40 is locked and is allowed to be opened only by authorized users.

In the image forming system 2 according to the second exemplary embodiment, in response to a print request from a document receiver by using the terminal device 20 to print a document which requires the original assurance or authenticity for a plural number of sets which exceeds the preset number Np, the first image forming apparatus 40 forms an image of this document up to the preset number Np of sets if the document is printed for the first time. The second image forming apparatus 50 forms an image of the document for the exceeded number Ns of sets.

Figure 8:
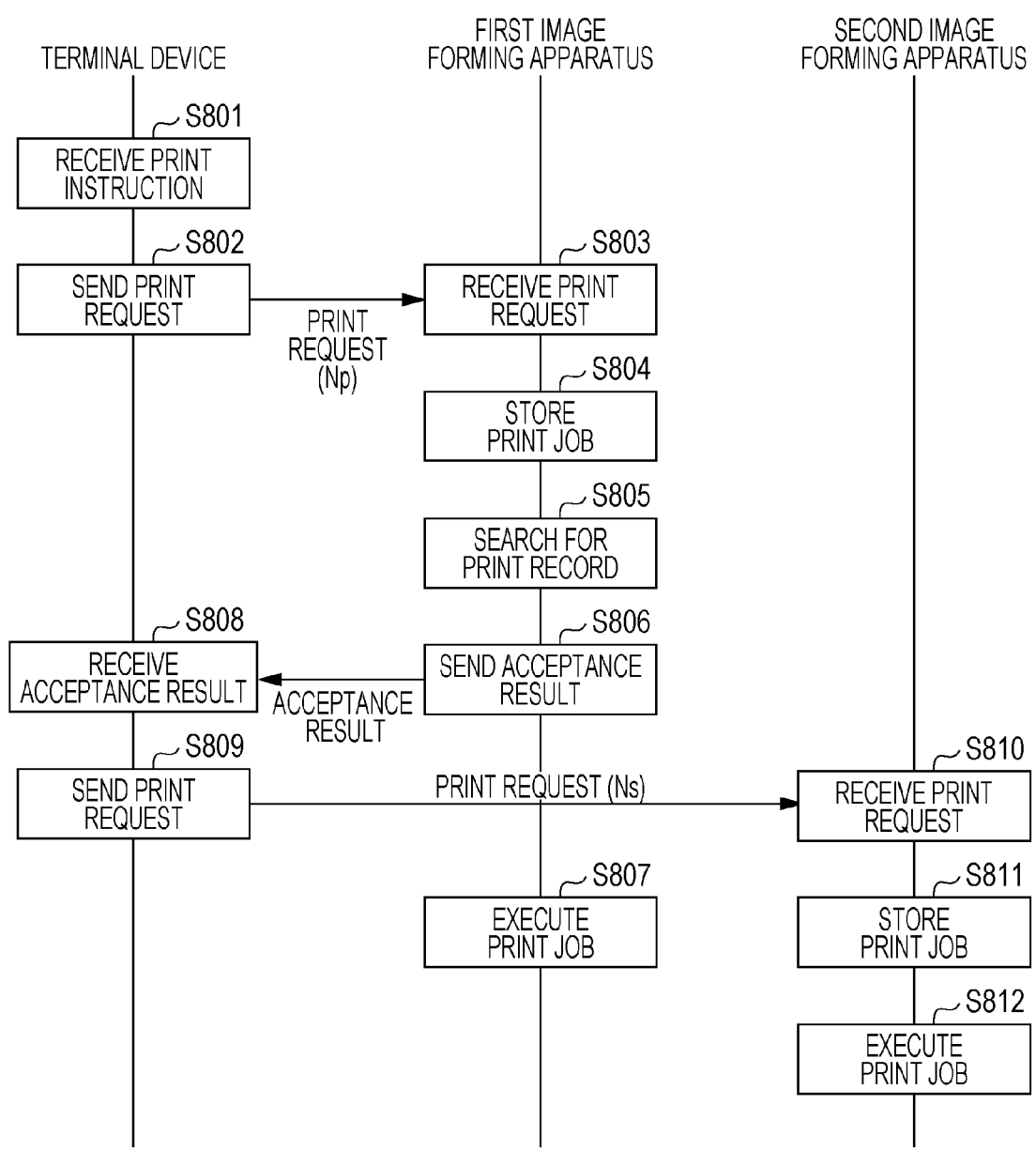
FIG. 8 is a sequence diagram illustrating an example of an operation performed by the image forming system according to the second exemplary embodiment.

FIG. 8 is a sequence diagram illustrating an example of the operation performed by the image forming system 2 according to the second exemplary embodiment. FIG. 8 illustrates an example in which the first image forming apparatus 40 accepts a print request sent from the terminal device 20.

In step S801, the terminal device 20 receives from a user a print instruction to print a document which requires the original assurance or authenticity for a plural number of sets which exceeds the preset number Np. In step S02, the terminal device 20 then sends a print request to print the document for the preset number Np of sets to the first image forming apparatus 40. In the first image forming apparatus 40, the print request receiver 131 receives the print request in step S803. The print control unit 134 stores the print request (print job) in the print job storage unit 132 in step S804, and then determines in step S805 whether a print record for document data included in the print job is stored in the print record storage unit 133. In step S806, the first image forming apparatus 40 sends an acceptance result to the terminal device 20. More specifically, if a print record for the document data is not stored in the print record storage unit 133, the print control unit 134 of the first image forming apparatus 40 sends an acceptance result that the print request has been accepted. In contrast, if a print record for the document data is stored in the print record storage unit 133, the print control unit 134 does not accept (rejects) the print request and returns an error to the terminal device 20. If the first image forming apparatus 40 accepts the print request, it executes the print job in step S807. That is, the first image forming apparatus 40 forms an image of the document data on the first recording medium P1 supplied from the first medium supply unit for the preset number Np of sets.

In step S808, the terminal device 20 receives the acceptance result from the first image forming apparatus 40. In this example, the terminal device 20 receives the acceptance result that the print request has been accepted from the first image forming apparatus 40. Thus, in step S809, the terminal device 20 sends a print request to print the document for the exceeded number Ns of sets to the second image forming apparatus 50. In the second image forming apparatus 50, the print request receiver 131 receives the print request in step S810. The print control unit 134 stores the print request (print job) in the print job storage unit 132 in step S811, and executes the print job in step S812. That is, the second image forming apparatus 50 forms an image of the document data on the second recording medium P2 supplied from the second medium supply unit for the exceeded number Ns of sets.

Although it is not shown in FIG. 8, if the first image forming apparatus 40 returns an error to the terminal device 20 in step S806, the terminal device 20 sends a print request to print the document data for the requested number Nd of sets to the second image forming apparatus 50. Then, the second image forming apparatus 50 forms an image of the document data on the second recording medium P2 supplied from the second medium supply unit for the requested number Nd of sets. The first image forming apparatus 40 does not execute the print job.

Figure 9:
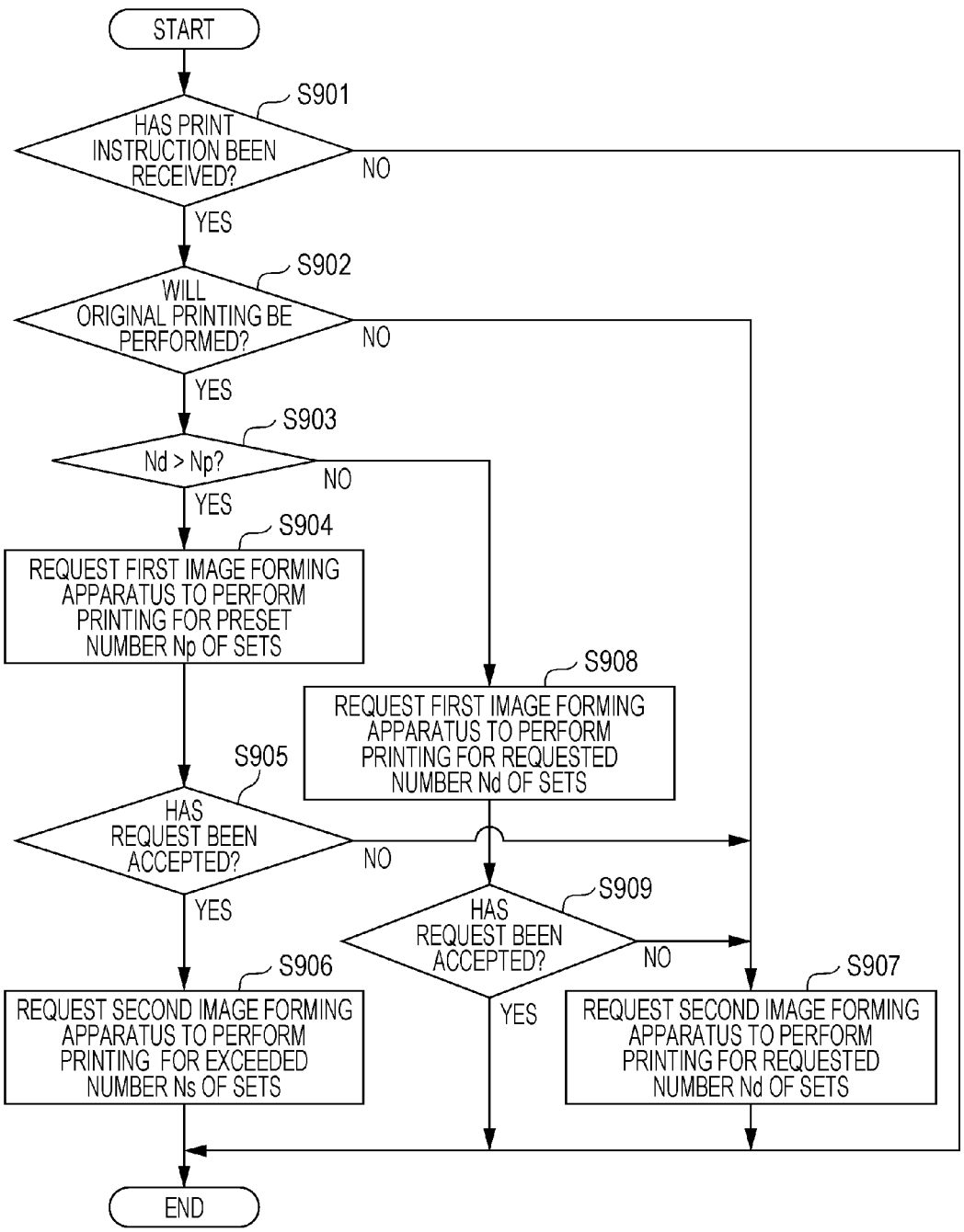
FIG. 9 is a flowchart illustrating print request processing executed by a terminal device according to the second exemplary embodiment.

FIG. 9 is a flowchart illustrating print request processing executed by the terminal device 20.

The terminal device 20 repeatedly executes this print request processing at regular preset intervals (one millisecond, for example).

In step S901, the terminal device 20 determines whether a print instruction has been received. If a print instruction has been received (YES in step S901), the terminal device 20 determines in step S902 whether this instruction is to print an original document. If this instruction is to print an original document (YES in step S902), the terminal device 20 determines in step S903 whether the requested number Nd of sets exceeds the preset number Np.

If the requested number Nd exceeds the preset number Np (YES in step S903), the terminal device 20 requests the first image forming apparatus 40 to print the document for the preset number Np of sets in step S904. The terminal device 20 then determines in step S905 whether the print request has been accepted. If the terminal device 20 receives a result that the request has been accepted (YES in step S905), it requests the second image forming apparatus 50 to print the document for the exceeded number Ns of sets in step S906. If the terminal device 20 receives an error from the first image forming apparatus 40, in other words, if the request is not accepted (NO in step S905), the terminal device 20 requests the second image forming apparatus 50 to print the document for the requested number Nd of sets in step S907 and finishes the print request processing.

If the requested number Nd does not exceed the preset number Np (NO in step S903), the terminal device 20 requests the first image forming apparatus 40 to print the document for the requested number Nd of sets in step S908. The terminal device 20 then determines in step S909 whether the print request has been accepted. If the terminal device 20 receives a result that the request has been accepted (YES in step S909), it finishes the print request processing. If the terminal device 20 receives an error from the first image forming apparatus 40, in other words, if the request is not accepted (NO in step S909), the terminal device 20 requests the second image forming apparatus 50 to print the document for the requested number Nd of sets in step S907 and finishes the print request processing.

If the instruction is not to print an original document (NO in step S902), the terminal device 20 requests the second image forming apparatus 50 to print the document for the requested number Nd of sets in step S907 and finishes the print request processing.

If a print instruction has not been received (NO in step S901), the terminal device 20 terminates the print request processing.

In the image forming system 2 configured as described above according to the second exemplary embodiment, in response to a print request to print document data which requires the original assurance or authenticity for a plural number of sets which exceeds the preset number Np, the terminal device 20 requests the first image forming apparatus 40 to perform print processing (original printing) only for the preset number Np of sets. The terminal device 20 then requests the second image forming apparatus 50 to perform print processing for the exceeded number Ns of sets. This enables the user to obtain, by simply making one print instruction, not only a document which requires the original assurance or authenticity for the preset number Np of sets, but also a copy of this document for the exceeded number Ns of sets at the same time.

Unlike the print job shown in FIG. 5, a print job in a print request sent from the terminal device 20 of the image forming system 2 to the first image forming apparatus 40 or the second image forming apparatus 50 may not contain an original flag. The reason for this is that the terminal device 20 determines in step 5902 whether a print instruction is to print an original document and sends a print request to the first image forming apparatus 40 or the second image forming apparatus 50 according to the determination result.

In the image forming system 2 according to the second exemplary embodiment, the first image forming apparatus 40 searches for a print record for document data included in a print request, and determines whether to accept printing an original of the document data according to whether the print record is found. Alternatively, the terminal device 20 may include a print record storage unit and detect before sending a print request whether a print record for document data included in a print instruction is stored. Then, in response to a print instruction to print document data for a plural number of sets which exceeds the preset number Np, if the terminal device 20 detects that this document data has not been printed before, it sends a print request to print the document data for the preset number Np of sets to the first image forming apparatus 40 and sends a print request to print the document data for the exceeded number Ns of sets to the second image forming apparatus 50. If the terminal device 20 detects that this document data has already been printed, it sends a print request to print the document data for the requested number Nd of sets to the second image forming apparatus 50.

In the image forming system 2 according to the second exemplary embodiment, in response to a print request, the first image forming apparatus 40 executes print processing (image formation) only when document data included in the print request is printed for the first time. However, in response to a print request to print the same document data again (the second or subsequent time), if the accumulated number of sets for which this document data has been printed in the first image forming apparatus 40 so far does not exceed the preset number Np, the image forming system 2 may execute the following processing. The first image forming apparatus 40 may execute print processing until the accumulated number of sets reaches the preset number Np, and the second image forming apparatus 50 may execute print processing for the remaining number of sets after the accumulated number of sets has reached the preset number Np.

[Third Exemplary Embodiment]

Figure 10:
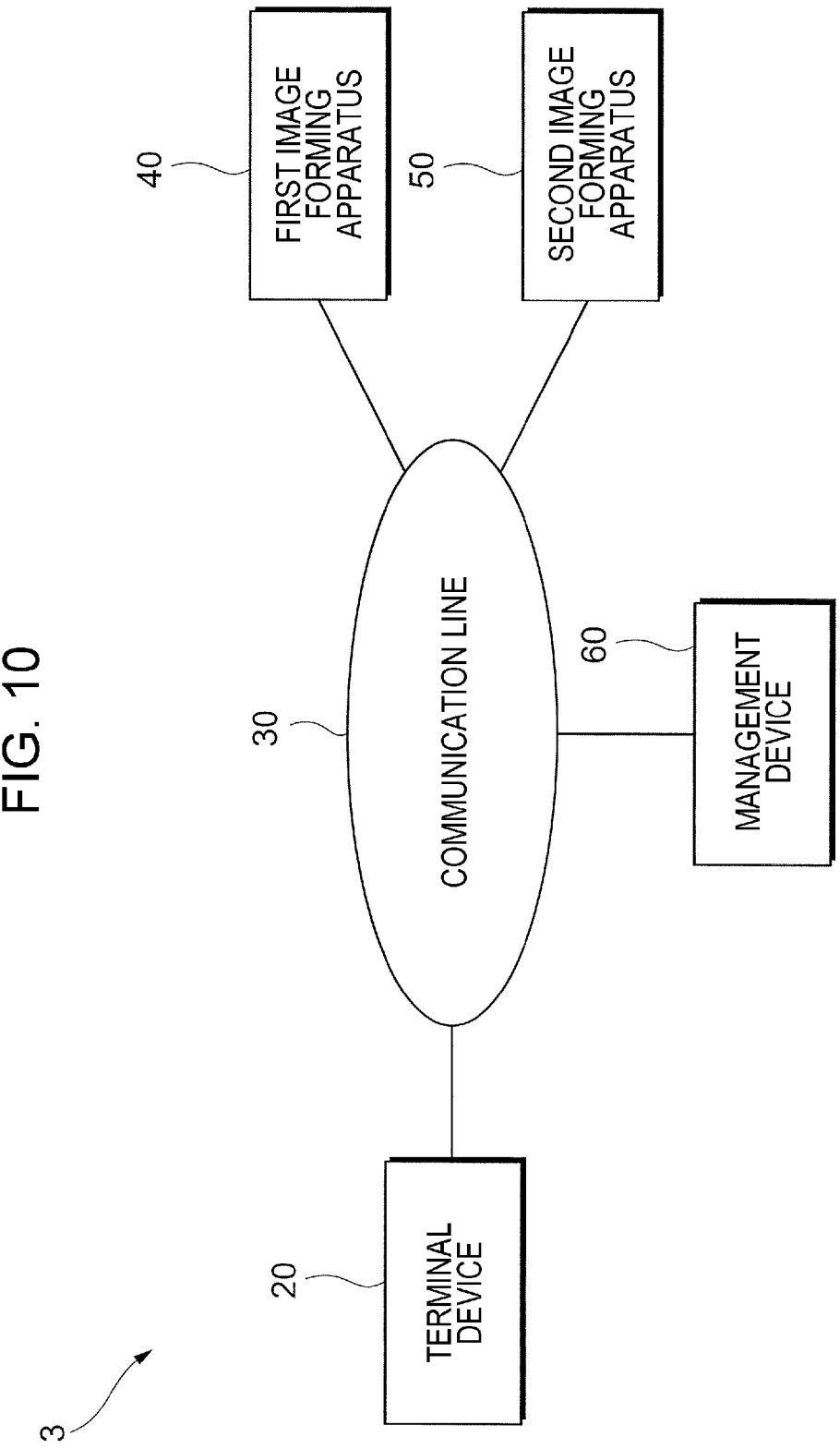
FIG. 10 illustrates an example of the schematic configuration of an image forming system according to a third exemplary embodiment.

FIG. 10 illustrates an example of the schematic configuration of an image forming system 3 according to a third exemplary embodiment of the invention.

The image forming system 3 differs from the image forming system 2 of the second exemplary embodiment in that a management device 60 is provided.

The terminal device 20, the first and second image forming apparatuses 40 and 50, and the management device 60 are connected to a communication line 30 so that they can communicate with each other via the communication line 30.

The hardware configuration of the management device 60 may be the same as that of the terminal device 20 shown in FIG. 2 according to the first exemplary embodiment.

Figure 11:
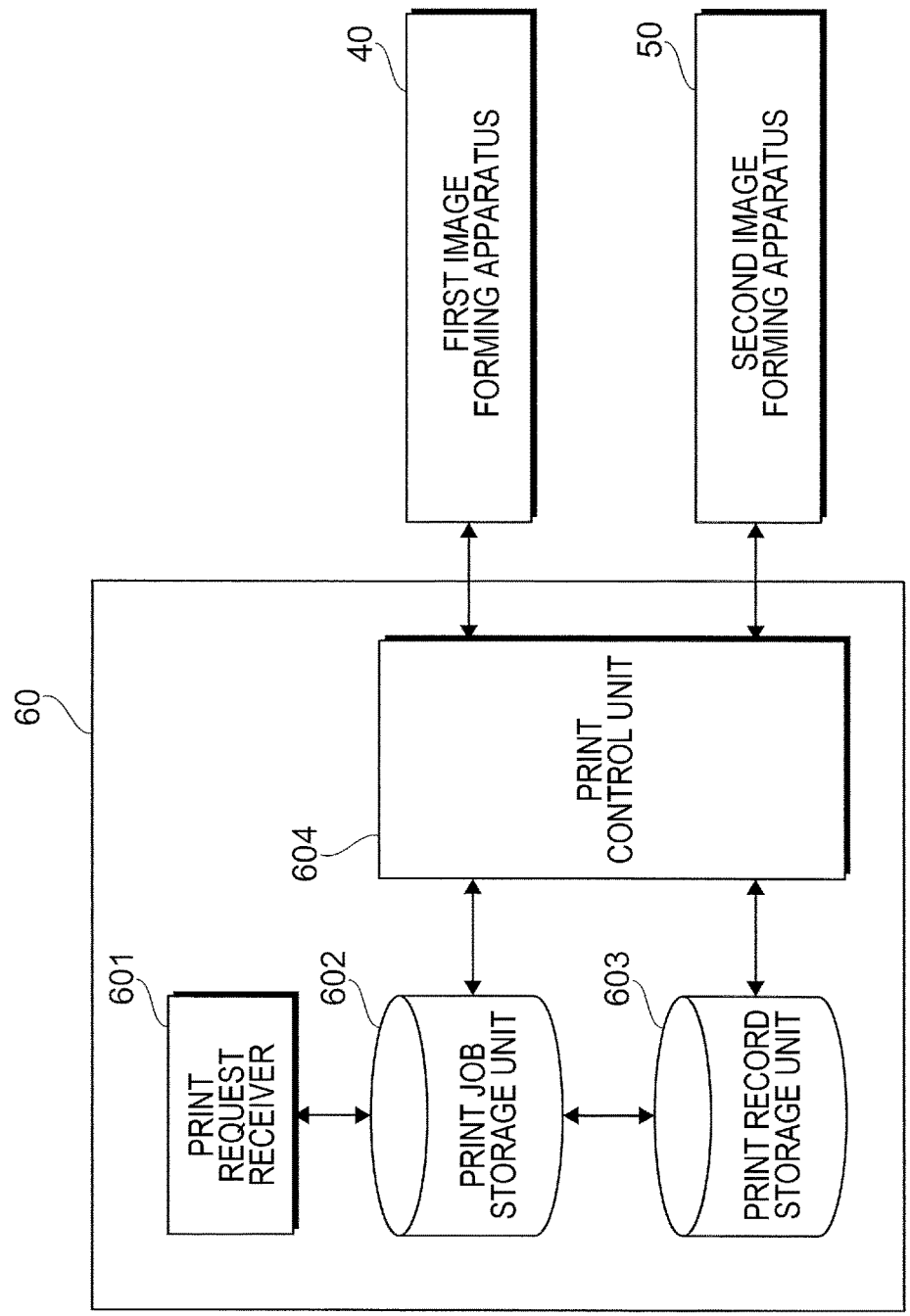
FIG. 11 is a block diagram illustrating an example of the functional configuration of a management device according to the third exemplary embodiment.

FIG. 11 is a block diagram illustrating an example of the functional configuration of the management device 60.

The management device 60 includes a print request receiver 601, a print job storage unit 602, a print record storage unit 603, and a print control unit 604. The print request receiver 601 receives a print request including a print job from the terminal device 20. The print job storage unit 602 stores a print job. The print record storage unit 603 stores a print record. The print control unit 604 controls printing by sending a print request to the first and second image forming apparatuses 40 and 50.

The print record storage unit 603 stores a document ID, a flag (original flag) indicating whether document data represented by this document ID is required to be printed as an original, and information indicating whether an original of the document data has already been printed, and if it has been printed, information indicating the accumulated number of print sets of this document printed as the original. In the print record storage unit 603, the document ID, the flag, and the above-described items of information are stored in association with each other. The print record storage unit 603 may be implemented by a HDD.

In the image forming system 3 according to the third exemplary embodiment, upon receiving a print instruction to print a document which requires the original assurance or authenticity for a plural number of sets which exceeds the preset number Np, the terminal device 20 sends a print request reflecting this print instruction to the management device 60. The management device 60 then searches for a print record for this document data and sends a print request to the first image forming apparatus 40 or the second image forming apparatus 50 according to the search result. That is, the management device 60 determines whether an original of the document data has already been printed and sends a print request to the first image forming apparatus 40 or the second image forming apparatus 50 according to the determination result. The management device 60 serves as an example of a requesting device which makes a request to print document data.

Figure 12:
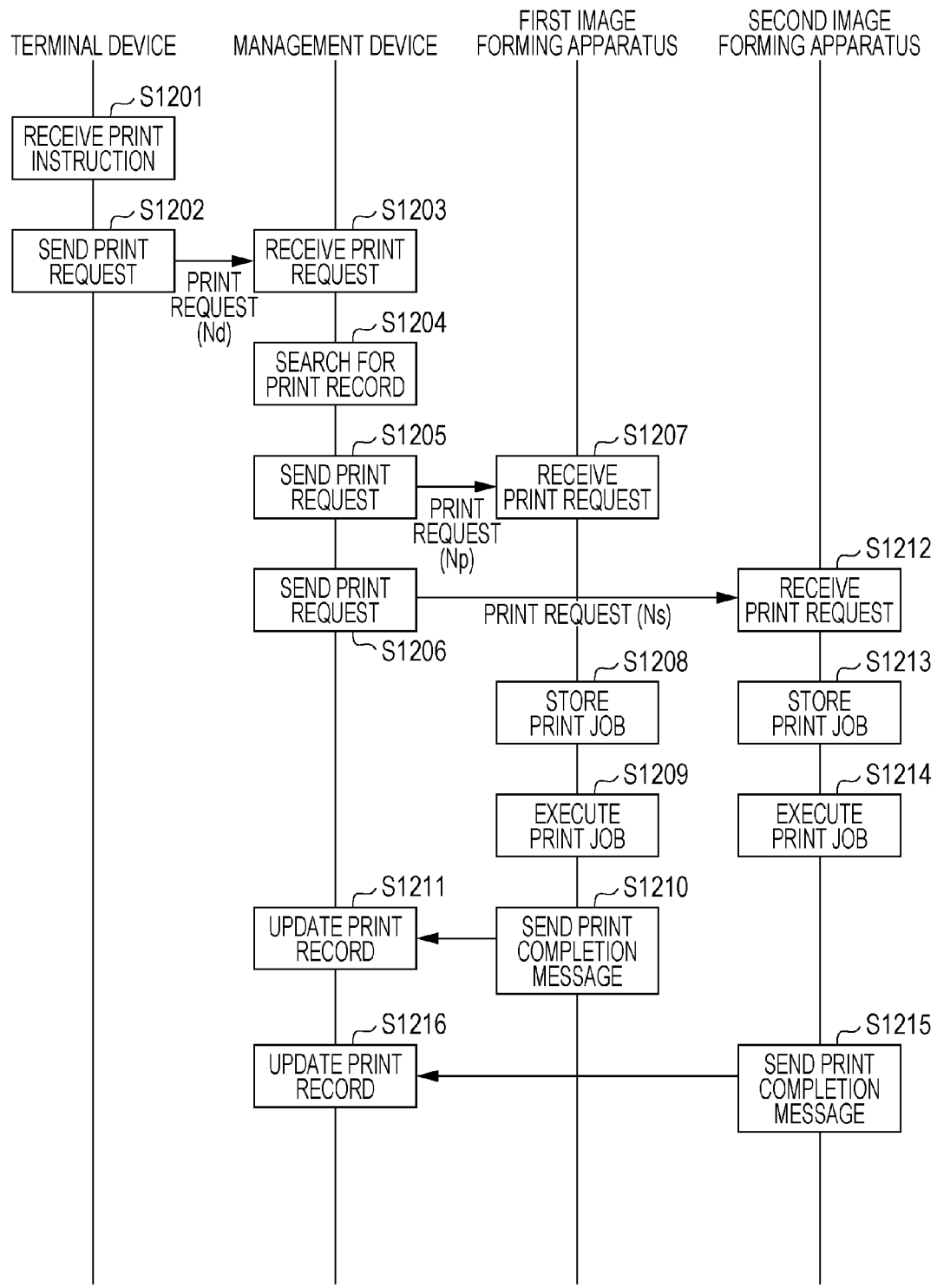
FIG. 12 is a sequence diagram illustrating an example of an operation performed by the image forming system according to the third exemplary embodiment.

FIG. 12 is a sequence diagram illustrating an example of the operation performed by the image forming system 3 according to the third exemplary embodiment. FIG. 12 illustrates an example in which the requested number Nd exceeds the preset number Np and an original of document data has not been printed yet.

In step S1201, the terminal device 20 receives from a user a print instruction to print a document which requires the original assurance or authenticity for the requested number Nd of sets. In step S1202, the terminal device 20 sends a print request to print the document for the requested number Nd of sets to the management device 60. Then, the management device 60 receives the print request in step S1203, and searches for a print record for the document data in step S1204. In this example, a print record for the document data is not found. Thus, in step S1205, the management device 60 sends a print request to print the document data for the preset number Np of sets to the first image forming apparatus 40. In step S1206, the management device 60 also sends a print request to print the document data for the exceeded number Ns of sets to the second image forming apparatus 50.

In the first image forming apparatus 40, the print request receiver 131 receives the print request in step S1207. The print control unit 134 stores the print request (print job) in the print job storage unit 132 in step S1208, and executes the print job in step S1209. Upon completion of printing, in step S1210, the print control unit 134 sends a print completion message to the management device 60. In step S1211, the management device 60 updates the print record.

In the second image forming apparatus 50, the print request receiver 131 receives the print request in step S1212. The print control unit 134 stores the print request (print job) in the print job storage unit 132 in step S1213, and executes the print job in step S1214. Upon completion of printing, in step S1215, the print control unit 134 sends a print completion message to the management device 60. In step S1216, the management device 60 updates the print record.

Figure 13:
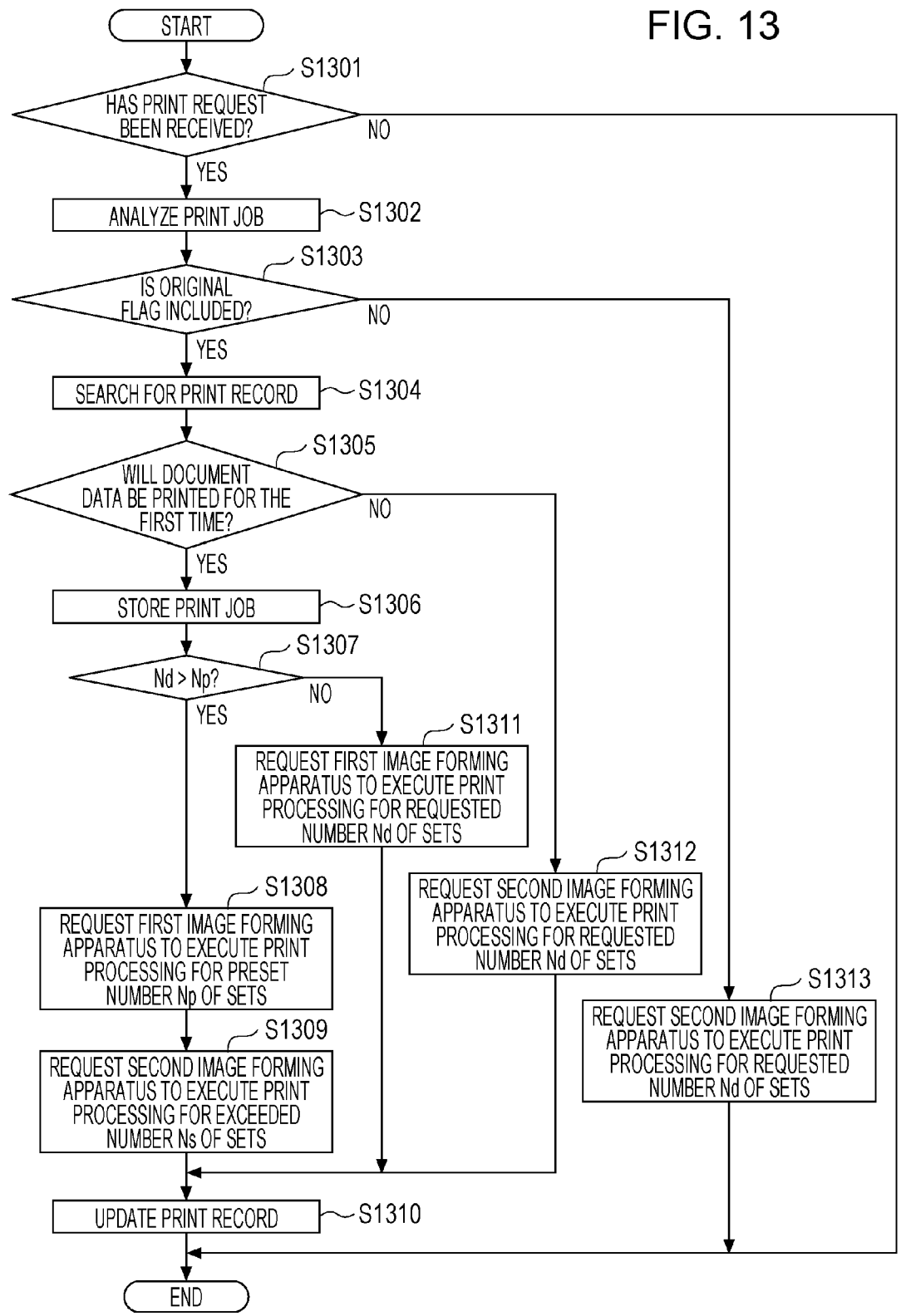
FIG. 13 is a flowchart illustrating print request processing executed by the management device.

FIG. 13 is a flowchart illustrating print request processing executed by the management device 60.

The management device 60 repeatedly executes this print request processing at regular preset intervals (one millisecond, for example).

In step S1301, the management device 60 determines whether the print request receiver 601 has received a print request from the terminal device 20. A print request received by the print request receiver 601 is stored in the print job storage unit 602. If a print request is received (YES in step S1301), the print control unit 604 analyzes a print job included in the received print request in step S1302. The print control unit 604 then determines in step S1303 whether the original flag is included in the received print job.

If the original flag is included (YES in step S1303), the print control unit 604 searches for a print record for document data included in this print job in step S1304. The print record is stored in the print record storage unit 603. As a result of a search in step S1304, the print control unit 604 determines in step S1305 whether the document data will be printed for the first time. If the document data is printed for the first time (YES in step S1305), the print control unit 604 stores the print job in step S1306, and determines in step S1307 whether the requested number Nd exceeds the preset number Np.

If the requested number Nd exceeds the preset number Np (YES in step S1307), the process proceeds to step S1308. In step S1308, the print control unit 604 sends a print request to print the document for the preset number Np of sets to the first image forming apparatus 40. In step S1309, the print control unit 604 sends a print request to print the document for the exceeded number Ns of sets to the second image forming apparatus 50. Then, in step S1310, the print control unit 604 updates the print record. More specifically, the print control unit 604 causes the print record storage unit 603 to store information that the document has been printed for the preset number Np of sets on the first recording medium P1 in the first image forming apparatus 40 and the document has been printed for the exceeded number Ns of sets on the second recording medium P2 in the second image forming apparatus 50.

If it is determined in step S1307 that the requested number Nd does not exceed the preset number Np (NO in step S1307), the process proceeds to step S1311. In step S1311, the print control unit 604 sends a print request to print the document for the requested number Nd of sets to the first image forming apparatus 40. Then, in step S1310, the print control unit 604 updates the print record. More specifically, the print control unit 604 causes the print record storage unit 603 to store information that the document has been printed for the requested number Nd of sets on the first recording medium P1 in the first image forming apparatus 40.

If it is determined in step S1305 that the document data will not be printed for the first time (NO in step S1305), the process proceeds to step S1312. In step S1312, the print control unit 604 sends a print request to print the document for the requested number Nd of sets to the second image forming apparatus 50. Then, in step S1310, the print control unit 604 updates the print record. More specifically, the print control unit 604 causes the print record storage unit 603 to store information that the document has been printed for the requested number Nd of sets on the second recording medium P2 in the second image forming apparatus 50.

If it is determined in step S1303 that the original flag is not included in the received print job (NO in step S1303), the process proceeds to step S1313. In step S1313, the print control unit 604 sends a print request to print the document for the requested number Nd of sets to the second image forming apparatus 50.

If it is determined in step S1301 that a print request has not been received (NO in step S1301), the management device 60 terminates the print request processing.

In the image forming system 3 configured as described above according to the third exemplary embodiment, in response to a print request to print document data which requires the original assurance or authenticity for a plural number of sets which exceeds the preset number Np, the management device 60 requests the first image forming apparatus 40 to perform print processing (original printing) only for the preset number Np of sets. It is thus possible to maintain the original assurance or authenticity. The management device 60 then requests the second image forming apparatus 50 to perform print processing for the exceeded number Ns of sets. This enables the user to obtain, by simply making one print instruction, not only a document which requires the original assurance or authenticity for the preset number Np of sets, but also a copy of this document for the exceeded number Ns of sets at the same time.

In the image forming system 3 according to the third exemplary embodiment, in response to a print request to print the same document data again (the second or subsequent time), the management device 60 requests the second image forming apparatus 50 to print the document for all the requested number Nd of sets if an original of the document data is found to be already printed based on the print record (step S1312). However, step S1312 may be executed in a different manner. If the accumulated number of sets for which this document data has been printed in the first image forming apparatus 40 so far does not exceed the preset number Np, the image forming system 3 may execute the following processing in step S1312. The first image forming apparatus 40 may execute print processing until the accumulated number of sets reaches the preset number Np, and the second image forming apparatus 50 may execute print processing for the remaining number of sets after the accumulated number of sets has reached the preset number Np.

[Fourth Exemplary Embodiment]

Figure 14:
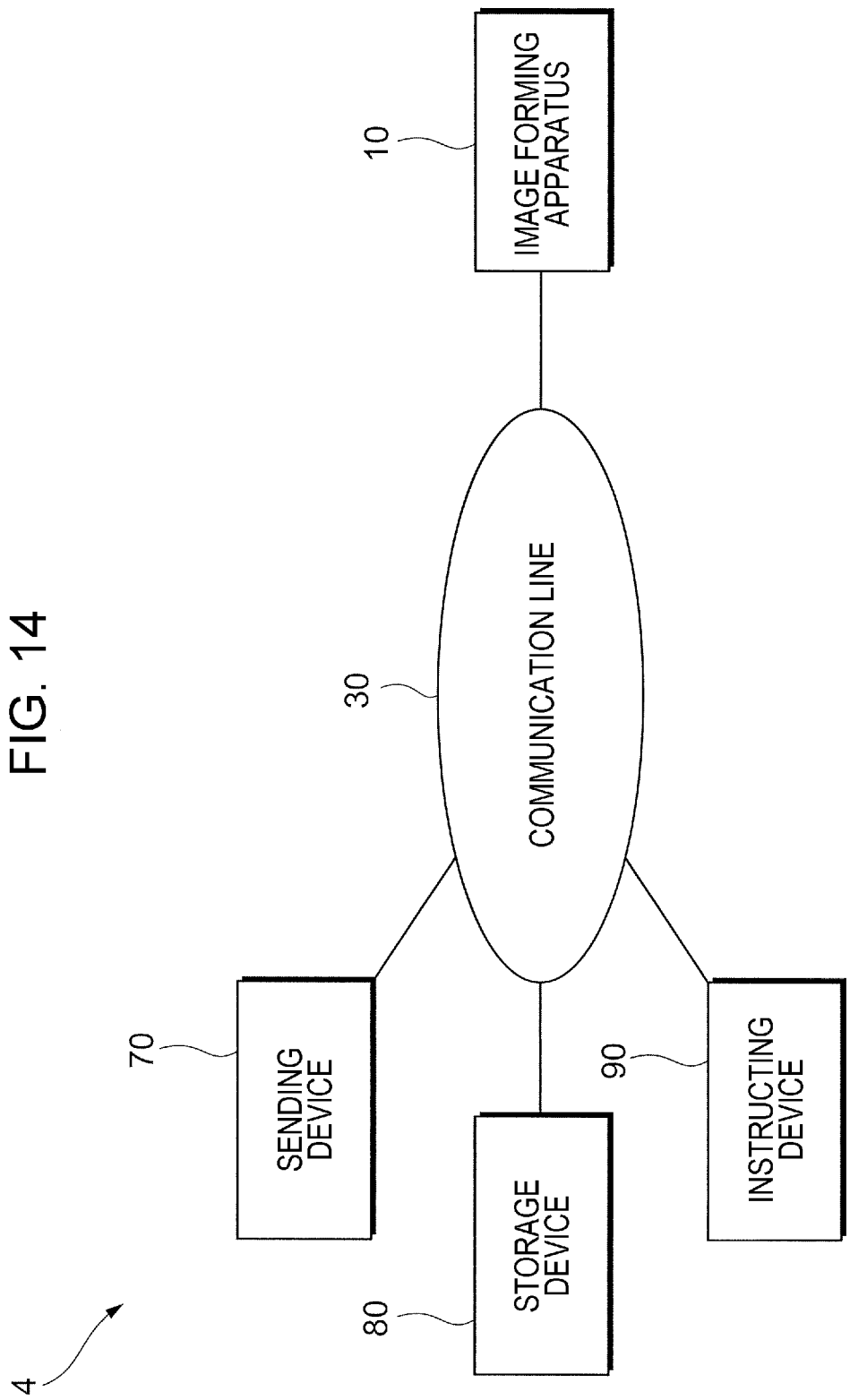
FIG. 14 illustrates an example of the schematic configuration of an image forming system according to a fourth exemplary embodiment.

FIG. 14 illustrates an example of the schematic configuration of an image forming system 4 according to a fourth exemplary embodiment of the invention.

The image forming system 4 includes a sending device 70, a storage device 80, an instructing device 90, and the image forming apparatus 10 according to the first exemplary embodiment.

The sending device 70, the storage device 80, the instructing device 90, and the image forming apparatus 10 are connected to a communication line 30 so that they can communicate with each other via the communication line 30.

The hardware configuration of each of the sending device 70, the storage device 80, and the instructing device 90 may be the same as that of the terminal device 20 shown in FIG. 2 according to the first exemplary embodiment.

The storage device 80 includes a print record storage unit that stores a document ID, a flag (original flag) indicating whether document data represented by this document ID is required to be printed as an original, and information indicating whether this document data has already been printed as an original, and if it has been printed, information indicating the accumulated number of print sets of this document printed as the original. In the print record storage unit, the document ID, the flag, and the above-described items of information are stored in association with each other.

In the image forming system 4 according to the fourth exemplary embodiment, a sender of a document (document sender) uses the sending device 70 to request the storage device 80 to supply the document. A receiver of this document (document receiver) then uses the instructing device 90 to request the storage device 80 to print the document. In response to a print instruction to print a document which requires the original assurance or authenticity for a plural number of sets which exceeds the preset number Np, the storage device 80 searches for a print record for document data included in the print instruction and sends a print request to the image forming apparatus 10 according to the search result. That is, the storage device 80 checks a print record storage unit to determine whether an original of the document data included in the print instruction has already been printed and sends a print request to the image forming apparatus 10 according to the determination result.

The document receiver may receive an instruction to request the storage device 80 to print a document from the document sender via email.

Figure 15A:
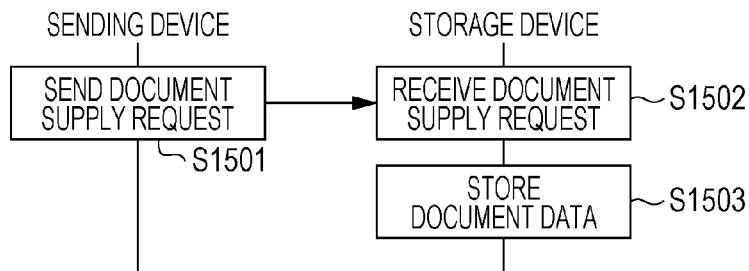
FIGS. 15A and 15B are a sequence diagram illustrating an example of an operation performed by the image forming system according to the fourth exemplary embodiment.
Figure 15B:
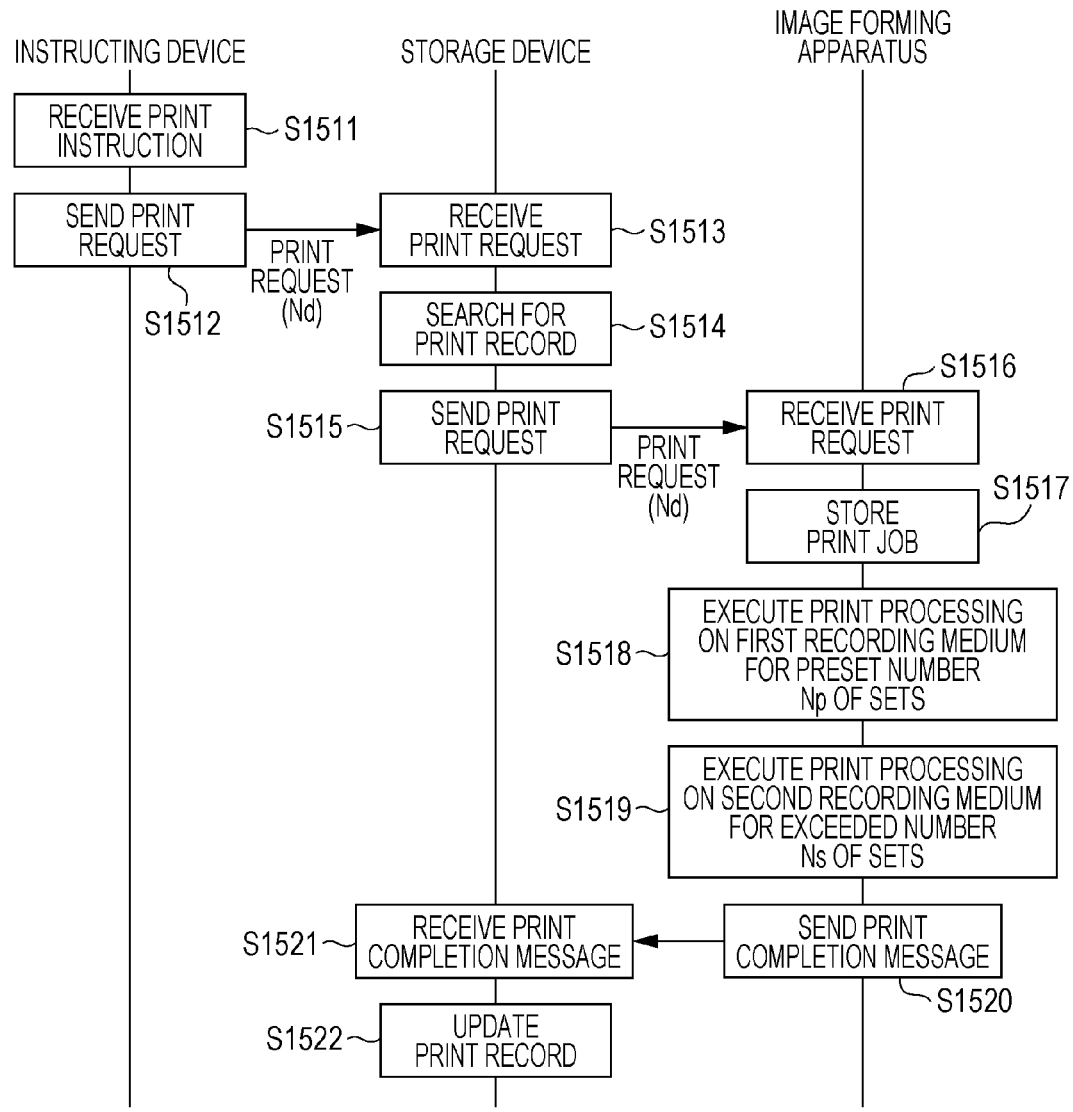

FIGS. 15A and 15B are a sequence diagram illustrating an example of the operation performed by the image forming system 4 according to the fourth exemplary embodiment. FIGS. 15A and 15B illustrate an example in which the requested number Nd exceeds the preset number Np and an original of document data has not been printed yet.

As shown in FIG. 15A, in step S1501, the sending device 70 receives an instruction to send a document supply request from a document sender and sends this document supply request to the storage device 80. In step S1502, the storage device 80 receives the document supply request from the sending device 70. In step S1503, the storage device 80 stores document data of this document.

As shown in FIG. 15B, in step S1511, the instructing device 90 receives from a document receiver a print instruction to print the document data for the requested number Nd of sets which exceeds the preset number Np. Then, in step S1512, the instructing device 90 sends a print request to print the document data for the requested number Nd of sets to the storage device 80. Then, the storage device 80 receives the print request in step S1513 and searches for a print record for this document data in step S1514. In this example, a print record for the document data is not found. Thus, in step S1515, the storage device 80 sends a print request to print the document data for the requested number Nd of sets to the image forming apparatus 10.

In the image forming apparatus 10, in step S1516, the print request receiver 131 receives the print request, and in step S1517, the print control unit 134 causes the print job storage unit 132 to store the print job. In step S1518, the print control unit 134 causes the first medium supply unit 151 to supply the first recording medium P1 for the preset number Np of sets, and causes the image forming device 120 to form an image of the document data on the first recording medium P1. That is, the image forming apparatus 10 executes print processing on the first recording medium P1 for the preset number Np of sets. Then, in step S1519, the print control unit 134 causes the second medium supply unit 152 to supply the second recording medium P2 for the exceeded number Ns of sets, and causes the image forming device 120 to form an image of the document data on the second recording medium P2. That is, the image forming apparatus 10 executes print processing on the second recording medium P2 for the exceeded number Ns of sets. Then, in step S1520, the image forming apparatus 10 sends a print completion message to the storage device 80.

The storage device 80 receives the print completion message in step S1521, and updates the print record in step S1522. More specifically, the storage device 80 stores information that an image has been formed on the first recording medium P1 for the preset number Np of sets and an image has been formed on the second recording medium P2 for the exceeded number Ns of sets.

Although it is not shown in FIG. 15B, if, as a result of a search in step S1514, an original of the document data has already been printed, the storage device 80 may send a print request to print the document data on the second recording medium P2 for all the requested number Nd of sets to the image forming apparatus 10. Alternatively, if the accumulated number of sets for which this document data has been printed on the first recording medium P1 so far does not exceed the preset number Np, the storage device 80 may send a print request to execute print processing on the first recording medium P1 until the accumulated number of sets reaches the preset number Np and to execute print processing on the second recording medium P2 for the remaining number of sets after the accumulated number of sets has reached the preset number Np.

In the image forming system 4 configured as described above according to the fourth exemplary embodiment, upon receiving by the storage device 80 a print request to print document data which requires the original assurance or authenticity for a plural number of sets which exceeds the preset number Np, the image forming apparatus 10 performs print processing (original printing) on the first recording medium P1 only for the preset number Np of sets. It is thus possible to maintain the original assurance or authenticity. The image forming apparatus 10 performs print processing on the second recording medium P2 for the exceeded number Ns of sets. This enables the user to obtain, by simply making one print instruction, not only a document which requires the original assurance or authenticity for the preset number Np of sets, but also a copy of this document for the exceeded number Ns of sets at the same time.

The storage device 80 may be included in the image forming apparatus 10 or in the instructing device 90, or may be an independent device (a server device, for example).

[Fifth Exemplary Embodiment]

Figure 16:
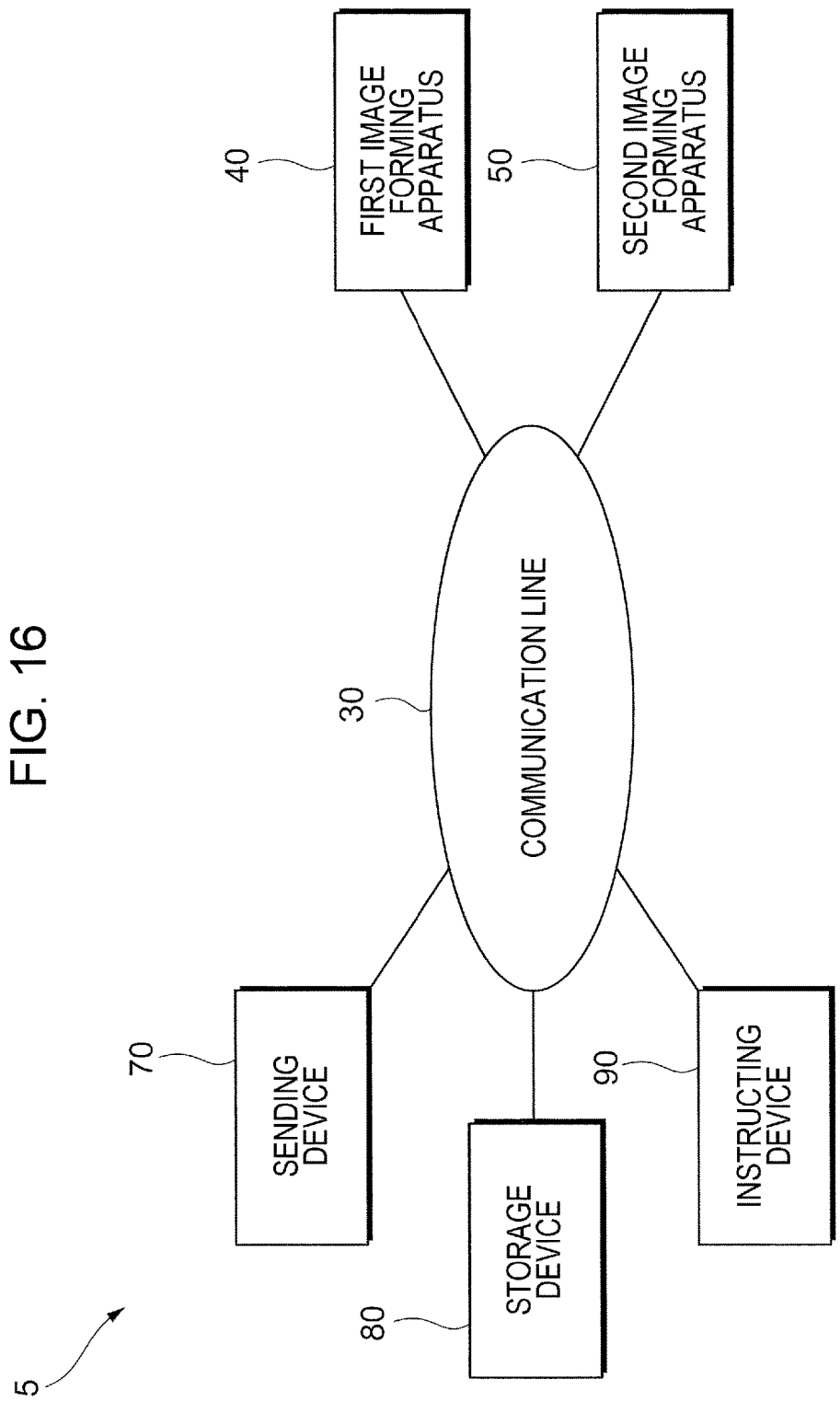
FIG. 16 illustrates an example of the schematic configuration of an image forming system according to a fifth exemplary embodiment.

FIG. 16 illustrates an example of the schematic configuration of an image forming system 5 according to a fifth exemplary embodiment of the invention.

The image forming system 5 includes the sending device 70, the storage device 80, and the instructing device 90 according to the fourth exemplary embodiment and the first and second image forming apparatuses 40 and 50 according to the second exemplary embodiment.

The sending device 70, the storage device 80, the instructing device 90, and the first and second image forming apparatuses 40 and 50 are connected to a communication line 30 so that they can communicate with each other via the communication line 30.

A description will be given of points concerning the image forming system 5 different from the image forming system 4 according to the fourth exemplary embodiment.

Figure 17:
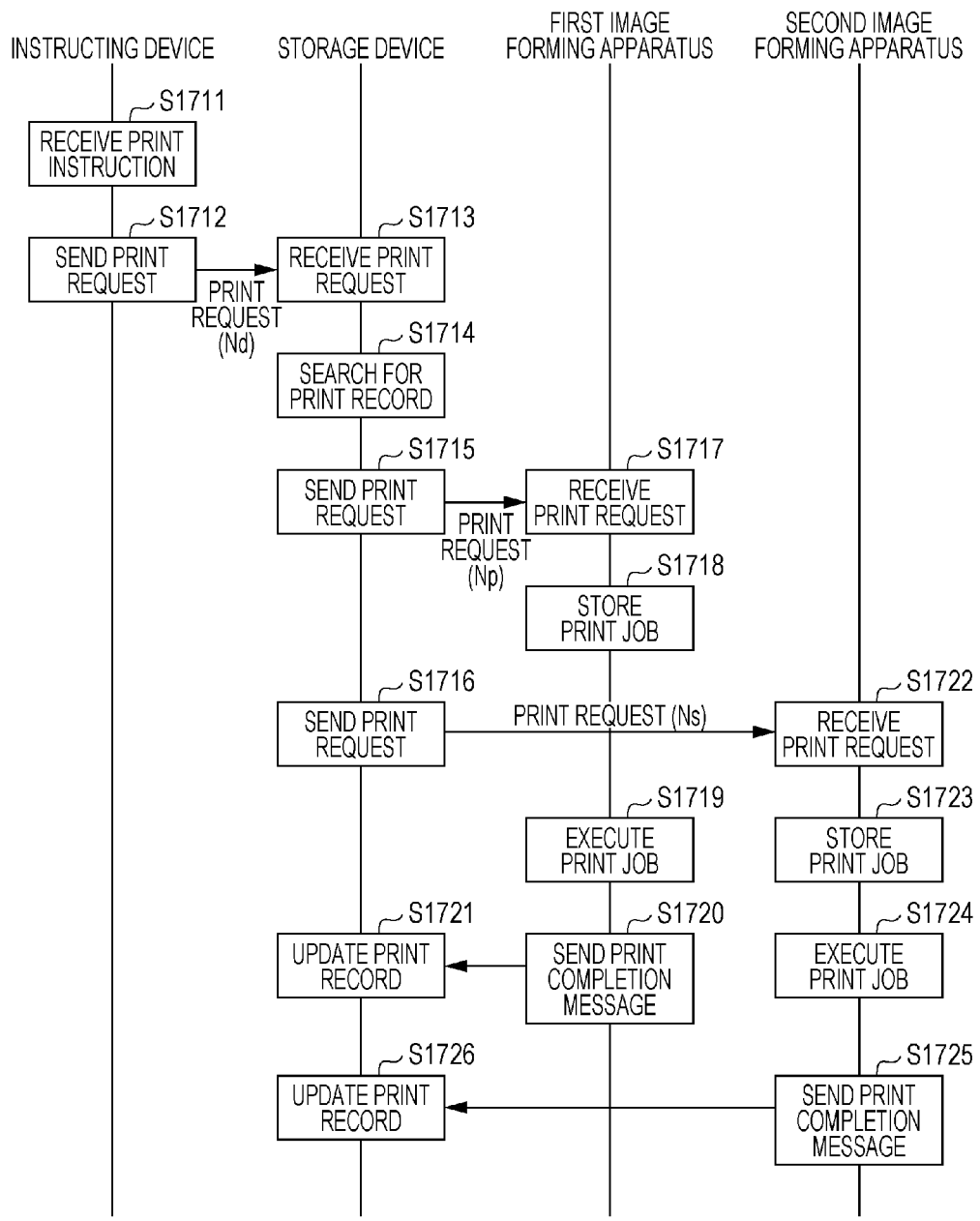
FIG. 17 is a sequence diagram illustrating an example of an operation performed by the image forming system according to the fifth exemplary embodiment.

FIG. 17 is a sequence diagram illustrating an example of the operation performed by the image forming system 5 according to the fifth exemplary embodiment. FIG. 17 illustrates an example in which the requested number Nd exceeds the preset number Np and an original of document data has not been printed yet.

As shown in FIG. 17, in step S1711, the instructing device 90 receives from a document receiver a print instruction to print document data for the requested number Nd of sets which exceeds the preset number Np. Then, in step S1712, the instructing device 90 sends a print request to print the document data for the requested number Nd of sets to the storage device 80. Then, the storage device 80 receives the print request in step S1713 and searches for a print record for this document data in step S1714. In this example, a print record for the document data is not found. Thus, the storage device 80 sends a print request to print the document data for the preset number Np of sets to the first image forming apparatus 40 in step S1715, and also sends a print request to print the document data for the exceeded number Ns of sets to the second image forming apparatus 50 in step S1716.

In the first image forming apparatus 40, in step S1717, the print request receiver 131 receives the print request. The print control unit 134 causes the print job storage unit 132 to store the print job in step S1718 and executes the print job in step S1719. Then, upon completion of printing, in step S1720, the first image forming apparatus 40 sends a print completion message to the storage device 80. The storage device 80 then updates the print record in step S1721.

In the second image forming apparatus 50, in step S1722, the print request receiver 131 receives the print request. The print control unit 134 causes the print job storage unit 132 to store the print job in step S1723 and executes the print job in step S1724. Then, upon completion of printing, in step S1725, the second image forming apparatus 50 sends a print completion message to the storage device 80. The storage device 80 then updates the print record in step S1726.

Although it is not shown in FIG. 17, if, as a result of a search in step S1714, an original of the document data has already been printed, the storage device 80 may send a print request to print the document data for all the requested number Nd of sets to the second image forming apparatus 50. Alternatively, if the accumulated number of sets for which this document data has been printed in the first image forming apparatus 40 so far does not exceed the preset number Np, the storage device 80 may send a print request to request the first image forming apparatus 40 to execute print processing until the accumulated number of sets reaches the preset number Np and send a print request to request the second image forming apparatus 50 to execute print processing for the remaining number of sets after the accumulated number of sets has reached the preset number Np.

In the image forming system 5 configured as described above according to the fifth exemplary embodiment, upon receiving by the storage device 80 a print request to print document data which requires the original assurance or authenticity for a plural number of sets which exceeds the preset number Np, the first image forming apparatus 40 performs print processing (original printing) only for the preset number Np of sets. It is thus possible to maintain the original assurance or authenticity. The storage device 80 causes the second image forming apparatus 50 to perform print processing for the exceeded number Ns of sets. This enables the user to obtain, by simply making one print instruction, not only a document which requires the original assurance or authenticity for the preset number Np of sets, but also a copy of this document for the exceeded number Ns of sets at the same time.

The storage device 80 may be included in the first image forming apparatus 40 or in the instructing device 90, or may be an independent device (a server device, for example).

[Sixth Exemplary Embodiment]

Figure 18:
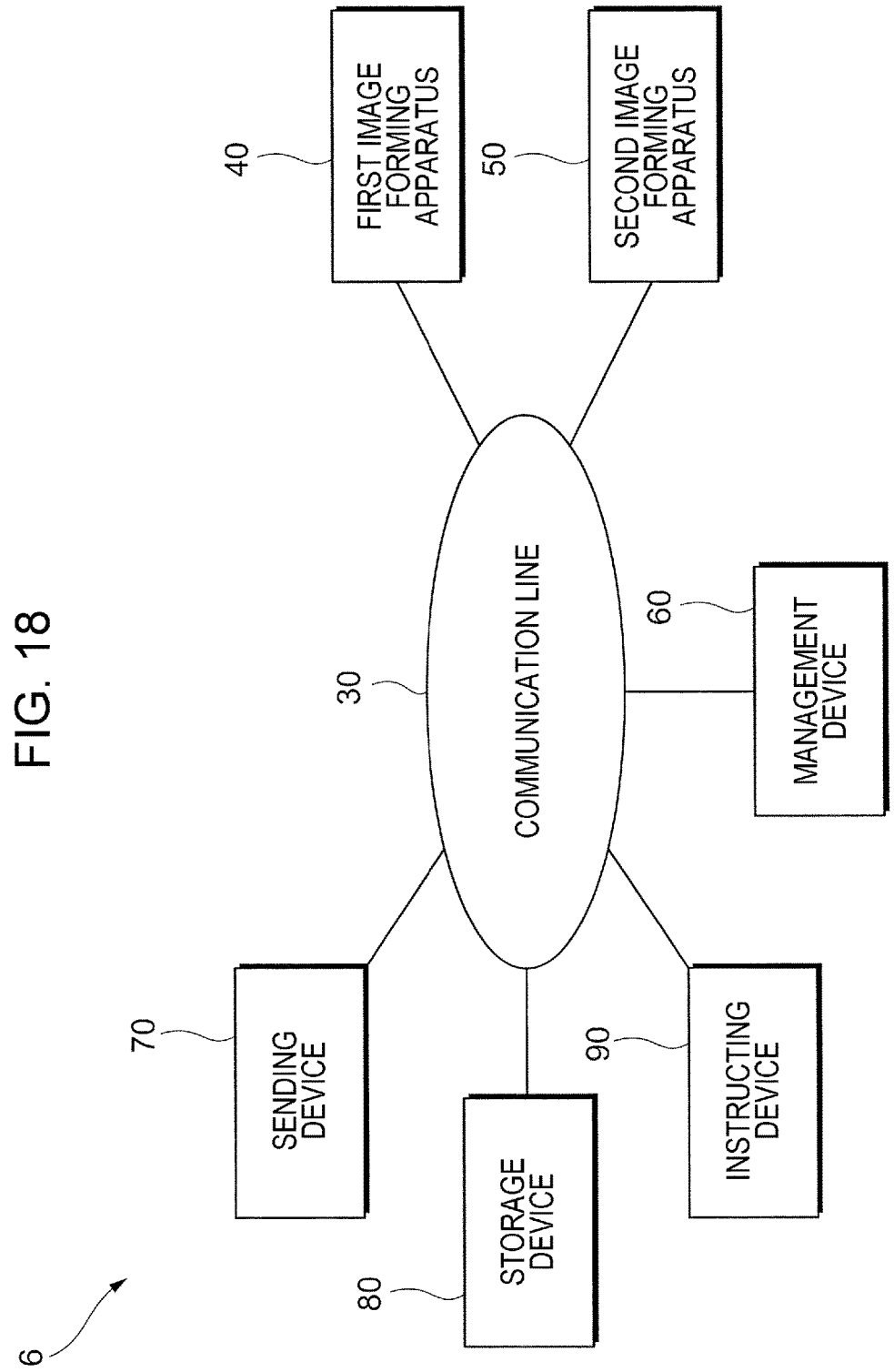
FIG. 18 illustrates an example of the schematic configuration of an image forming system according to a sixth exemplary embodiment.

FIG. 18 illustrates an example of the schematic configuration of an image forming system 6 according to a sixth exemplary embodiment of the invention.

The image forming system 6 includes the sending device 70, the storage device 80, and the instructing device 90 according to the fourth exemplary embodiment, the management device 60 according to the third exemplary embodiment, and the first and second image forming apparatuses 40 and 50 according to the second exemplary embodiment.

The sending device 70, the storage device 80, the instructing device 90, the management device 60, and the first and second image forming apparatuses 40 and 50 are connected to a communication line 30 so that they can communicate with each other via the communication line 30.

A description will be given of points concerning the image forming system 6 different from the image forming system 5 according to the fifth exemplary embodiment.

Figure 19:
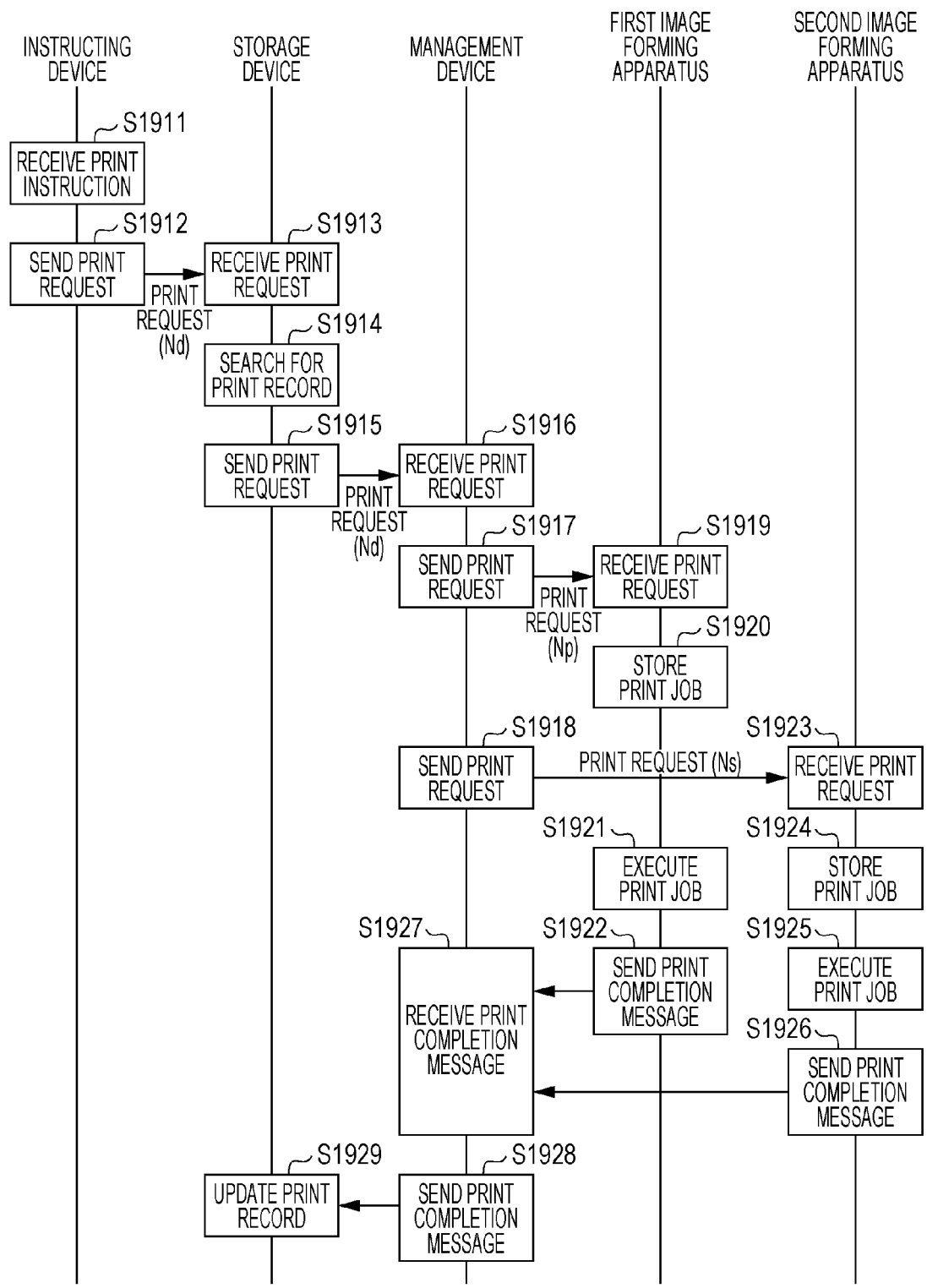
FIG. 19 is a sequence diagram illustrating an example of an operation performed by the image forming system according to the sixth exemplary embodiment.

FIG. 19 is a sequence diagram illustrating an example of the operation performed by the image forming system 6 according to the sixth exemplary embodiment. FIG. 19 illustrates an example in which the requested number Nd exceeds the preset number Np and an original of document data has not been printed yet.

As shown in FIG. 19, in step S1911, the instructing device 90 receives from a document receiver a print instruction to print document data for the requested number Nd of sets which exceeds the preset number Np. Then, in step S1912, the instructing device 90 sends a print request to print the document data for the requested number Nd of sets to the storage device 80. Then, the storage device 80 receives the print request in step S1913 and searches for a print record for this document data in step S1914. In this example, a print record for the document data is not found. Thus, the storage device 80 sends a print request to print the document data for the requested number Nd of sets to the management device 60 in step S1915. The management device 60 receives the print request in step S1916. The management device 60 sends a print request to print the document data for the preset number Np of sets to the first image forming apparatus 40 in step S1917, and also sends a print request to print the document data for the exceeded number Ns of sets to the second image forming apparatus 50 in step S1918.

In the first image forming apparatus 40, in step S1919, the print request receiver 131 receives the print request. The print control unit 134 causes the print job storage unit 132 to store the print job in step S1920 and executes the print job in step S1921. Then, upon completion of printing, in step S1922, the first image forming apparatus 40 sends a print completion message to the management device 60.

In the second image forming apparatus 50, in step S1923, the print request receiver 131 receives the print request. The print control unit 134 causes the print job storage unit 132 to store the print job in step S1924 and executes the print job in step S1925. Then, upon completion of printing, in step S1926, the second image forming apparatus 50 sends a print completion message to the management device 60.

The management device 60 receives the print completion messages from the first and second image forming apparatuses 40 and 50 in step S1927, and sends them to the storage device 80 in step S1928. The storage device 80 then updates the print record in step S1929.

Although it is not shown in FIG. 19, if, as a result of a search in step S1914, an original of the document data has already been printed, the storage device 80 may send a print request to print the document data for all the requested number Nd of sets to the second image forming apparatus 50. Alternatively, if the accumulated number of sets for which this document data has been printed in the first image forming apparatus 40 so far does not exceed the preset number Np, the storage device 80 may send a print request to request the first image forming apparatus 40 to execute print processing until the accumulated number of sets reaches the preset number Np and send a print request to request the second image forming apparatus 50 to execute print processing for the remaining number of sets after the accumulated number of sets has reached the preset number Np.

In the image forming system 6 configured as described above according to the sixth exemplary embodiment, upon receiving by the management device 60 a print request to print document data which requires the original assurance or authenticity for a plural number of sets which exceeds the preset number Np, the first image forming apparatus 40 performs print processing (original printing) only for the preset number Np of sets. It is thus possible to maintain the original assurance or authenticity. The management device 60 causes the second image forming apparatus 50 to perform print processing for the exceeded number Ns of sets. This enables the user to obtain, by simply making one print instruction, not only a document which requires the original assurance or authenticity for the preset number Np of sets, but also a copy of this document for the exceeded number Ns of sets at the same time.

The storage device 80 may be included in the first image forming apparatus 40, the instructing device 90, or the management device 60. Alternatively, the storage device 80 may be an independent device (a server device, for example).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a first medium supply unit;
   a second medium supply unit; and
   an image forming unit that forms, upon receiving an instruction to print a first number of sets of a document, an image of the document on a medium supplied from the first medium supply unit up to a second number of sets and that forms the image on a medium supplied from the second medium supply unit for a remaining number of the first number of sets,
   wherein, upon receiving instructions to print the document again, the image forming unit forms an image of the document on a medium supplied from the second medium supply unit.

2. The image forming apparatus according to claim 1, wherein the image forming unit forms an image of the document on a medium supplied from the first medium supply unit up to the preset number of sets.

3. The image forming apparatus according to claim 1, wherein a storage which stores a medium to be supplied from the first medium supply unit is locked.

4. The image forming apparatus according to claim 1, further comprising:
   a storage unit that stores, in association with the document, information indicating that an image of the document is formed on a medium supplied from the first medium supply unit.

5. The image forming apparatus according to claim 1, further comprising:
   a storage unit that stores, in association with the document, information indicating an accumulated number of sets for which an image of the document is formed on a medium supplied from the first medium supply unit,
   wherein, upon receiving an instruction to print the document data again, after the accumulated number of sets reaches the preset number of sets, the image forming unit forms an image of the document on a medium supplied from the second medium supply unit for a remaining number of sets.

6. The image forming apparatus according to claim 5, wherein, upon receiving an instruction to print the document data again for a plural number of sets, if the accumulated number of sets does not exceed the preset number of sets, the image forming unit forms an image of the document data on a medium supplied from the first medium supply unit until the accumulated number of sets reaches the preset number of sets, and after the accumulated number of sets reaches the preset number of sets, the image forming unit forms an image of the document on a medium supplied from the second medium supply unit for a remaining number of the plural number of sets.

7. An image forming apparatus comprising:
   a supply unit that supplies a medium; and
   an image forming unit that forms, upon receiving an instruction to form a first number of sets of a document, an image of the document on a medium supplied from the supply unit up to a second number of sets and does not form an image on a medium supplied from the supply unit for a remaining number of the plural number of sets,
   wherein upon receiving instructions to print the document again, the image forming unit forms an image of the document on a medium supplied from a second medium supply unit.

8. An image forming system comprising:
   a first image forming apparatus that forms an image of a document on a first medium; and
   a second image forming apparatus that forms an image of the document on a second medium,
   wherein, if the document satisfies a predetermined condition, the first image forming apparatus forms an image of the document for a first number of sets up to a preset number of the first number of sets, and the second image forming apparatus forms an image of the document for a remaining number of the first number of sets, and
   upon receiving an instruction to print the document again, the second image forming apparatus forms an image of the document.

9. The image forming system according to claim 8, wherein the first image forming apparatus forms an image of the document up to the preset number of sets.

10. The image forming system according to claim 8, wherein a storage of the first image forming apparatus which stores the first medium is locked.

11. The image forming system according to claim 8, further comprising:
    a storage unit that stores, in association with the document data, information indicating that an image of the document data is formed in the first image forming apparatus.

12. The image forming system according to claim 8, further comprising:
    a storage unit that stores, in association with the document, information indicating an accumulated number of sets for which an image of the document is formed in the first image forming apparatus,
    wherein, upon receiving an instruction to print the document data again, after the accumulated number of sets reaches the preset number of sets, the second image forming apparatus forms an image of the document data for a remaining number of sets.

13. The image forming system according to claim 12, wherein, upon receiving an instruction to print the document data again for a second number of sets, if the accumulated number of sets does not exceed the preset number of sets, the first image forming apparatus forms an image of the document data until the accumulated number of sets reaches the preset number of sets, and after the accumulated number of sets reaches the preset number of sets, the second image forming apparatus forms an image of the document data for a remaining number of the second number of sets.

14. The image forming system according to claim 8, further comprising:
    a requesting device that makes a request to print the document,
    wherein, if the document data satisfies the predetermined condition, the requesting device causes the first image forming apparatus to form an image of the document up to the preset number of the plural number of sets, and causes the second image forming apparatus to form an image of the document data for a remaining number of the first number of sets.

15. An image forming system comprising:
a storage device that stores a document; and
an image forming apparatus that forms an image of the document on a medium,
the image forming apparatus comprising
a first medium supply unit,
a second medium supply unit, and
an image forming unit that forms, upon receiving an instruction to print a first number of sets of the document stored in the storage device, an image of the document on a medium supplied from the first medium supply unit up to a second number of sets and that forms the image of the document on a medium supplied from the second medium supply unit for a remaining number of the first number of sets,
wherein upon receiving an instruction to print the document again, the image forming apparatus forms an image of the document on the medium supplied from the second medium supply unit.

\* \* \* \* \*